United States Patent [19]

Darden et al.

[11] 4,287,562

[45] Sep. 1, 1981

[54] REAL TIME ADAPTER UNIT FOR USE IN A DATA PROCESSING SYSTEM

[75] Inventors: Boyd E. Darden, St. Petersburg, Fla.; Henry F. Hartley, Lowell, Mass.

[73] Assignee: Honeywell Information Systems Inc., Waltham, Mass.

[21] Appl. No.: 73,058

[22] Filed: Sep. 6, 1979

[51] Int. Cl.[3] ............................................... G06F 3/00
[52] U.S. Cl. ............................................... 364/200
[58] Field of Search ... 364/200 MS File, 900 MS File

[56] References Cited

U.S. PATENT DOCUMENTS

| | | | |
|---|---|---|---|
| 3,178,689 | 4/1965 | McKenna | 364/200 |
| 3,714,635 | 1/1973 | Hamilton et al. | 364/200 |
| 3,742,457 | 6/1973 | Calle et al. | 364/200 |
| 3,771,144 | 11/1973 | Belady et al. | 364/200 |
| 3,845,282 | 10/1974 | Mattson | 235/92 CA |
| 4,017,839 | 4/1977 | Calle et al. | 364/200 |
| 4,020,472 | 4/1977 | Bennett et al. | 364/200 |
| 4,025,906 | 5/1977 | Riikonen | 364/200 |
| 4,100,601 | 7/1978 | Kaufman et al. | 364/200 |
| 4,120,029 | 10/1978 | Steiner | 364/200 |

OTHER PUBLICATIONS

M6800 Microprocessor Application Manual, Motorola Inc., 1975, pp. 4-46 to 4-48.

Primary Examiner—Gareth D. Shaw
Assistant Examiner—Eddie P. Chan
Attorney, Agent, or Firm—Faith F. Driscoll; Nicholas Prasinos

[57] ABSTRACT

A data processing system includes a central processing unit, a main store and device controllers which couple to a bus system. Each controller has a number of device adapter units. One controller includes a real time adapter unit which instead of being connected to control a peripheral device is connected to provide a timer facility for use by the central processing unit in executing tasks. The real time adapter unit includes microprocessing circuits and clock circuits. These circuits are connected to provide accurate and reliable time of day values in response to commands from the central processing unit.

31 Claims, 7 Drawing Figures

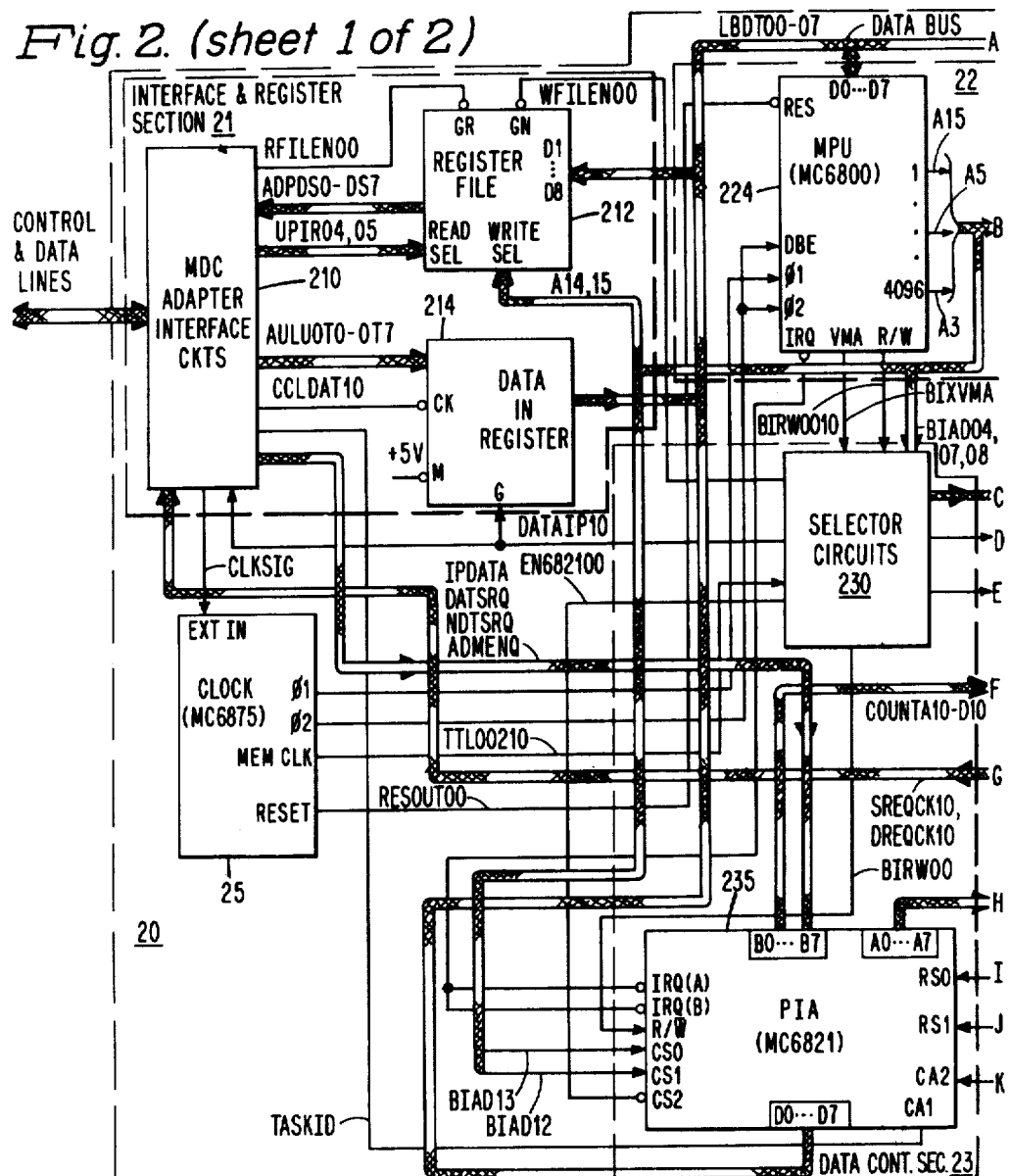
Fig. 2. (sheet 1 of 2)

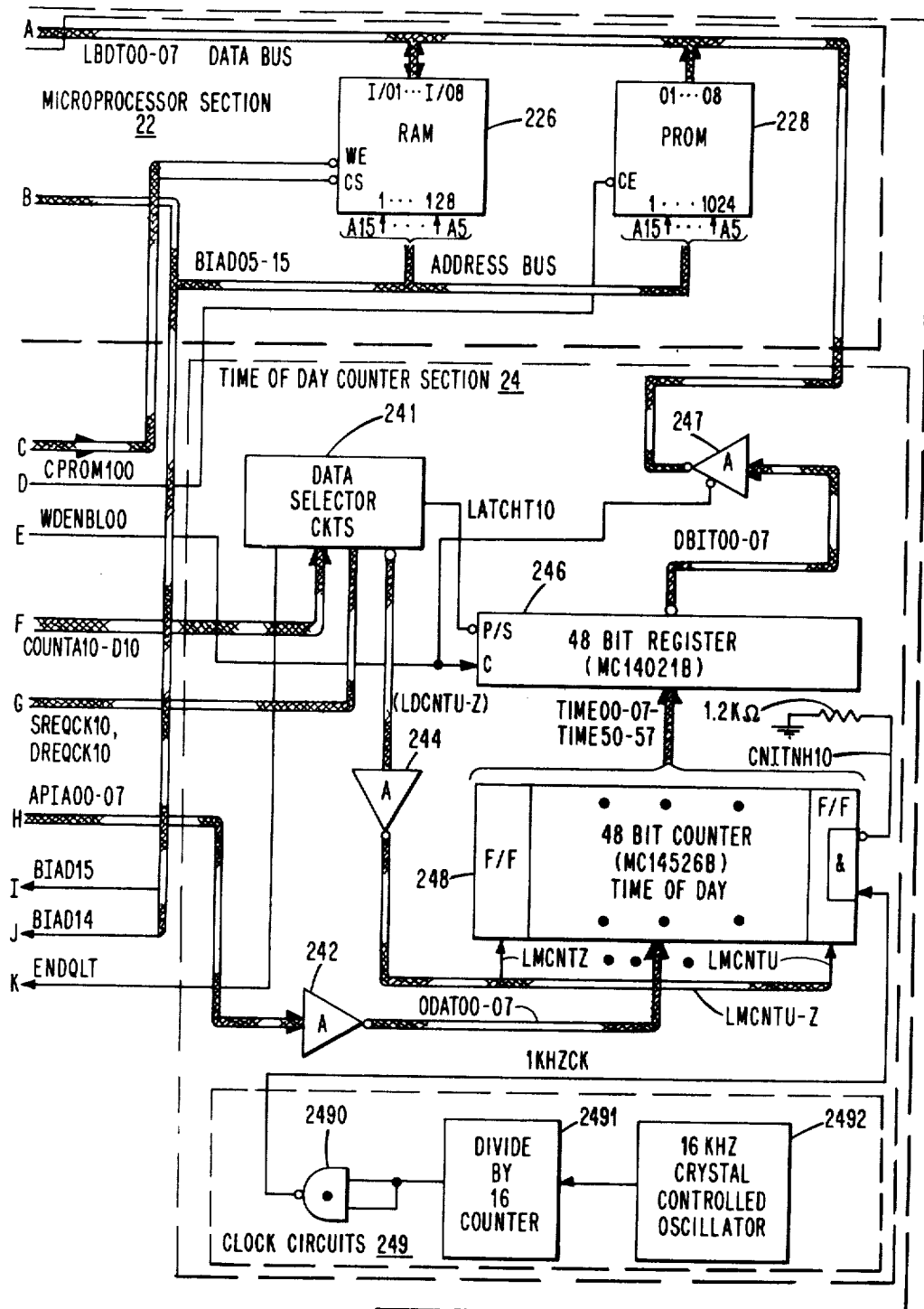
Fig. 2. (sheet 2 of 2)

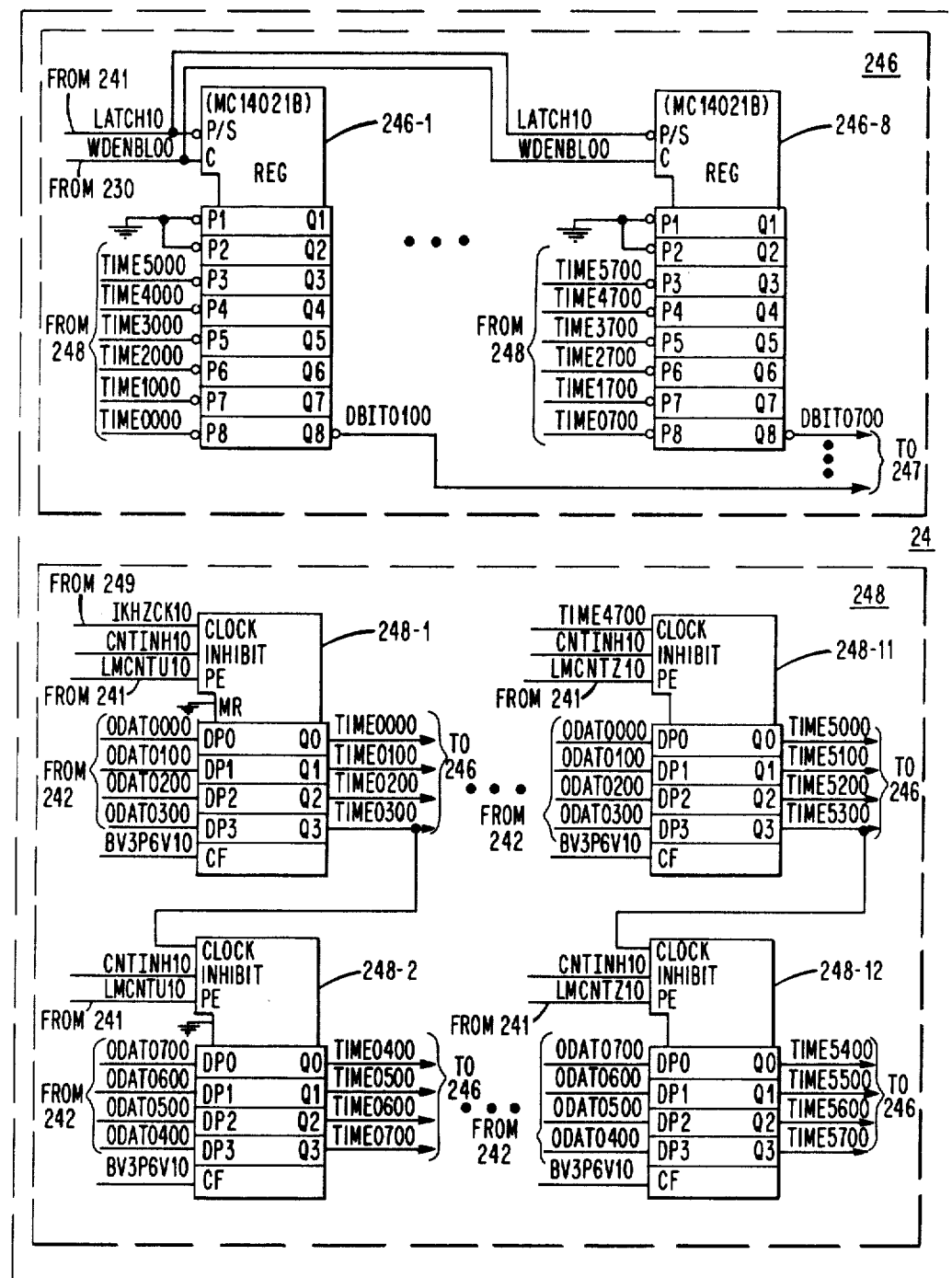
Fig. 3c. (sheet 1 of 2)

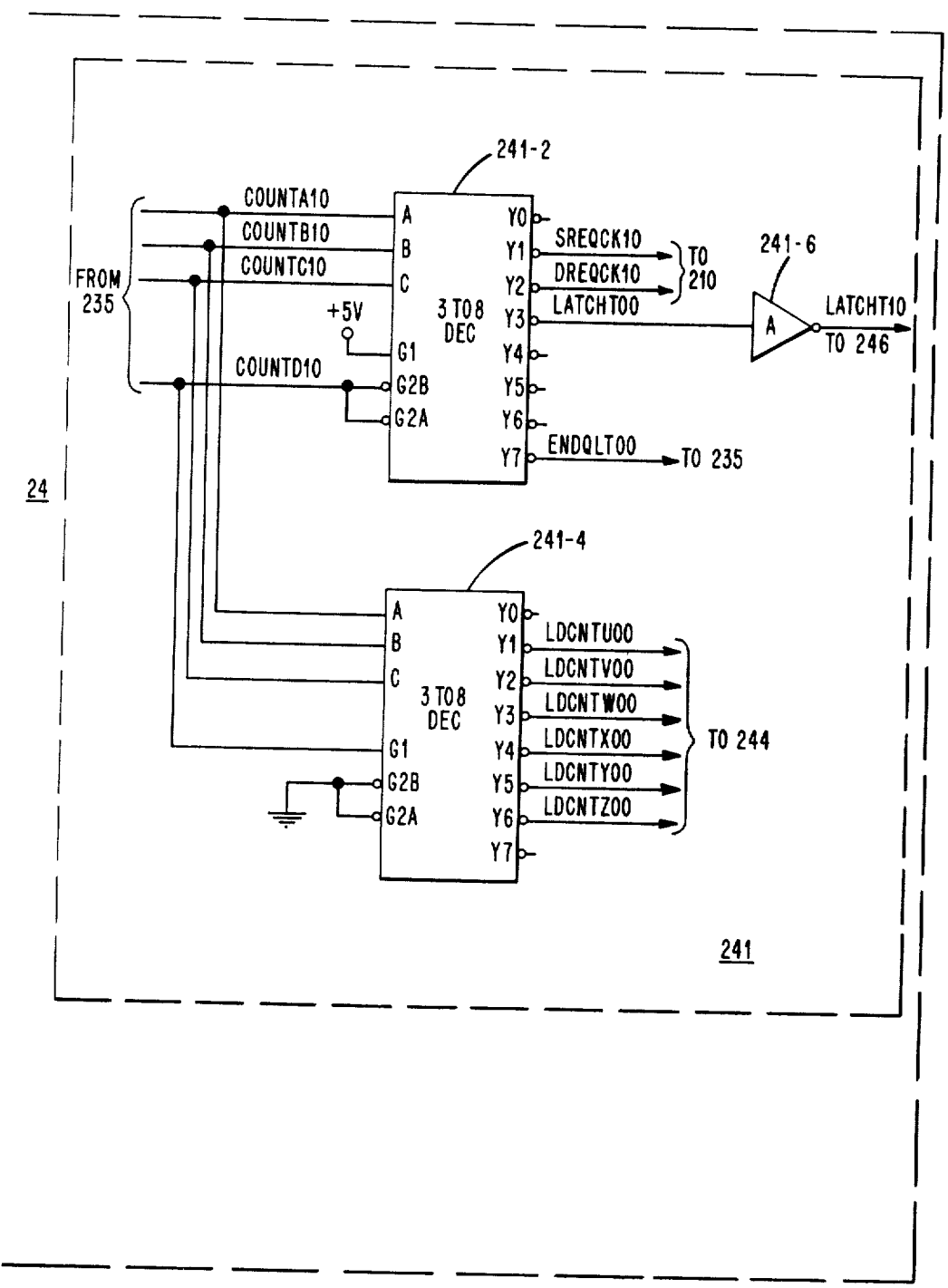
Fig. 3c. (sheet 2 of 2)

REAL TIME ADAPTER UNIT FOR USE IN A DATA PROCESSING SYSTEM

BACKGROUND OF THE INVENTION

1. Field of Use

The present invention relates to timers and more particularly to real time clock apparatus utilized by a data processing system.

2. Prior Art

It is well known that many computer applications require precision time generation apparatus such as a real time clock or an accurate time delay for the supervision of assigned programming tasks and the like. In general, in those instances in which accurate periods are required, an external circuit is used to time the necessary periods.

The clock when started continues to time a period until it is completed and the time is up. This results in an interrupt to the central processing unit which references a software clock manager routine for updating a real time clock counter word stored in the processing unit's main memory.

The several types of real time clocks include a programmable real time clock wherein the actual required period is preprogrammed within the clock by hardware or software, a free running real time clock which runs continuously with the clock signalling the central processing unit at the end of each period and a time of day clock which provides the central processing unit with the actual time. One type of real time clock is disclosed in U.S. Pat. No. 4,099,255 which issued to Philip E. Stanley, et al, and is assigned to the same assignee as named herein.

For the most part, real time clocks of the type mentioned usually require operator intervention in setting up the time of day and increase system overhead in requiring the central processing unit to update counter values in main memory which can be readily converted to a real time of day indication.

Accordingly, it is an object of the present invention to provide a real time apparatus which will minimize the system overhead required to be expended to provide a time of day clock capability.

It is a further object of the present invention to provide time of day clock apparatus which would provide an accurate indication of the time of day whenever interrogated by the central processing unit.

SUMMARY OF THE INVENTION

These objects are achieved in a preferred embodiment of the present invention which includes an adapter unit which couples to one of the controllers of a data processing system. The controller couples to a central processing unit. The adapter unit includes a microprocessing unit and clock circuits. The clock circuits of the preferred embodiment include a 48-bit independently operated free running counter and a 48-bit latch register for storing a time of day value in milliseconds read out of the counter. As part of an initialization operation, the central processing unit generates a command to the adapter unit. This causes the microprocessing unit to load the time of day counter with an initial time of day value received from the central processing unit. Thereafter, the central processing unit can generate commands to the adapter for read out of the time of day value. Each command causes the microprocessing unit to generate a capture pulse which loads or reads out the entire time of day millisecond count into the 48-bit latch register.

In accordance with the present invention, the read out operation is repeated a second time in order to determine whether the time was read out at the same time the time of day value was being updated. This is determined by comparing predetermined bytes of the first and second time of day values. If there is a comparison, the microprocessing unit permits the transfer of the second time value to the central processing unit. Where a miscompare is detected, the microprocessing unit causes the time to be read a third time and this value read is thereafter transferred to the central processing unit.

The above arrangement of the present invention eliminates the effect of transitions produced by an update operation from altering the accuracy of the time value being read. That is, it insures that the time value is being read at a point in which no change or transition is taking place.

Since the microprocessing unit is arranged to generate the series of capture pulses within an interval which is much less than the rate at which the time of day counter is being updated or incremented (once every millisecond), this enables the real time adapter to transfer accurate time of day values to the central processing unit whenever it makes such requests. This is notwithstanding the fact that both the central processing unit and real time adapter unit utilize independently operated clock circuits. Moreover, the arrangement eliminates any requirement for providing additional circuits for synchronizing the operations of the time of day clock circuits and central processing unit clock circuits.

Additionally, the arrangement of the present invention by only requiring the comparison of one byte of the successively read time values accomplishes such checking within a minimum of time. This recognizes that only the first byte need be examined since it would not be possible to have the other significant bytes encounter a transition or change during an update operation without having the same change or transition being reflected in such first byte.

Also, in the preferred embodiment, the 48-bit latch register includes a number of shifting registers. This facilitates the transfer of the time of day value in milliseconds in bytes to the microprocessing unit. Such transfers are accomplished by sampling the outputs of all of the shift registers while the trailing edge of a transfer pulse clocks the next byte into the output positions of these registers. During such clocking, zeros are loaded into the input stage of the shift register used for storing the least significant byte resulting in clearing the shift registers in anticipation for next read operation. The arrangement enables the microprocessing unit to read out all of the bytes which comprise the time of day value with a single address. This results in a reduction in circuit complexity and time expended in processor address generation.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are

BRIEF DESCRIPTION OF THE DRAWINGS

FIG. 2 is a block diagram of the real time adapter apparatus of FIG. 1.

FIGS. 3a through 3c show in greater detail different portions of the real time adapter of FIG. 2.

DESCRIPTION OF THE PREFERRED EMBODIMENT

Figure 1:
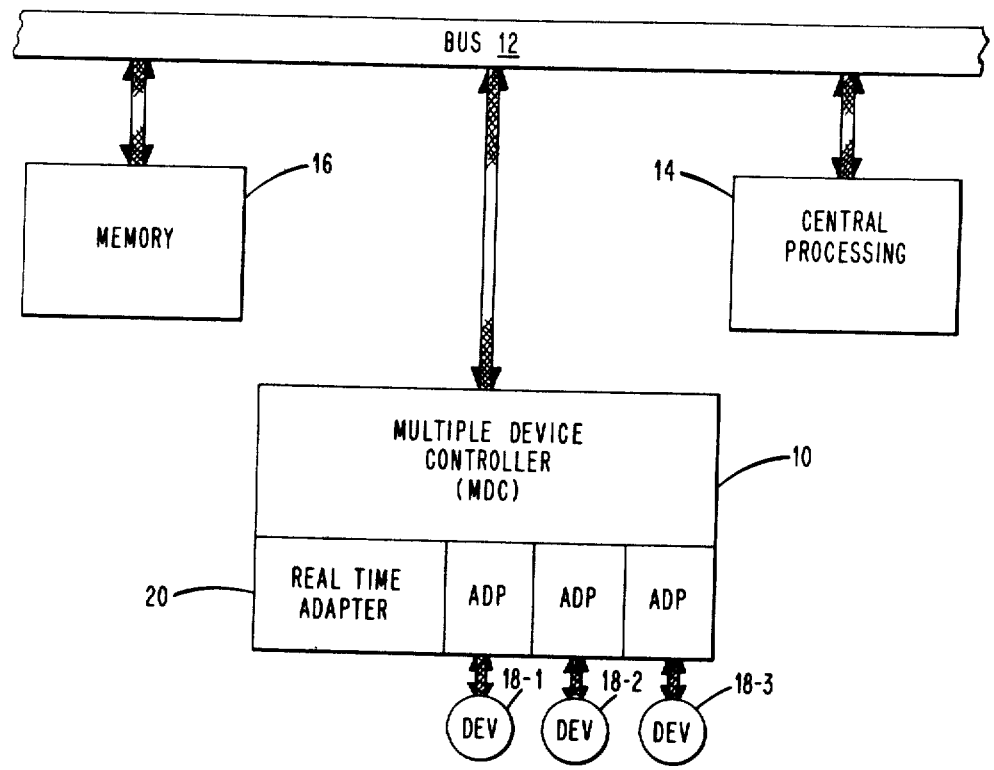
FIG. 1 is a block diagram of a data processing system which incorporates the real time adapter apparatus of the present invention.

FIG. 1 is a block diagram of the system in which the real time adapter of the present invention is to be utilized. As seen from the figure, the system includes a central processing unit 14, a memory unit 16 and a multiple device controller 10 each of which couple to a bus 12. The controller 14 may for example service up to four devices through different ones of the adapter units 20. One the the adapters corresponds to the real time adapter of the present invention while the others connect to different ones of the devices 18-1 through 18-3 as shown. The controller 10 may take the form of the microprogrammable controller disclosed in U.S. Pat. No. 4,025,906 issued May 24, 1977 and which is assigned to the same assignee as named herein.

GENERAL DESCRIPTION OF PREFERRED EMBODIMENT OF ADAPTER 20

FIG. 2 discloses in block diagram form the real time adapter 20 of the present invention. Referring to the figure, it is seen that the major sections of the adapter 200 include an interface and register section 21, MPU section 22, a data control section 23, a time of day counter 24, and a clock circuit section 25. The interface and register section 21 under control of the microprocessor section 22 transfers time of day data and status information, and interrupt signals to the MDC 10. It also receives and stores data and control information transferred from MDC 10.

Register Section 21

As shown, section 21 includes the control logic circuits of block 210, a register file 212 and an eight bit data-in register 214 connected to the lines of interface 15 and the internal address and data busses of section 22 as shown. The units of section 21 also receive control and enabling signals from sections 23 and 24. The interface circuits 210 provide control signals (i.e. DATSRQ-IPDATA) as inputs to sections 23 and 24.

The register file 212 is constructed from a pair of 4 by 4 register files with tristate outputs. Each file is organized as 4 words of 4 bits and includes separate read/write addressing for simultaneous reading and writing. The files are constructed from SN74LS670 register file chips manufactured by Texas Instruments Inc. and are described in the publication "*The TTL Data Book for Design Engineers*", Copyright 1976 by Texas Instruments. The data-in register 214 is constructed from a pair of 4 bit register circuits with tristate outputs such as SN74LS295 manufactured by Texas Instruments Inc.

Section 22

The microprocessor section 22 includes a microprocessor (MPU) 224 and associated random access memory (RAM) 226 and programmable read only memory (PROM) 228. The units 224, 226 and 228 connect to the internal data and address busses of section 22 as shown. The MPU 224 corresponds to the MC6800 microprocessor unit manufactured by Motorola Inc. which is described in the publication "*Basic Microprocessors and the 6800*", by Ron Bishop, Copyright 1979 by Hayden Book Company Inc. and in U.S. Pat. No. 3,962,682. The various descriptions of this microprocessor unit and other units are incorporated by reference to the extent necessary for an understanding of the present invention. Briefly, the MPU 224 is an 8-bit processor which executes instructions within a minimum execution time of 2 microseconds. The processor addresses the units which connect to it via certain ones of the lines A0-A15 of the 16-bit address bus and transfers data over the lines D0-D7 of an 8-bit bidirectional data bus at a one megahertz clock rate established by the clock signals from the circuits of section 25. The MPU 224 includes two, 8-bit accumulators (A, B), a 16-bit index register (IR), a 16-bit stack pointer register (SP), a 16-bit program counter (PA), and an 8-bit condition code register (CC). The two, 8-bit accumulators are used to store the operands and the results generated by an arithmetic and logic unit (ALU) included therein.

Figure 5:
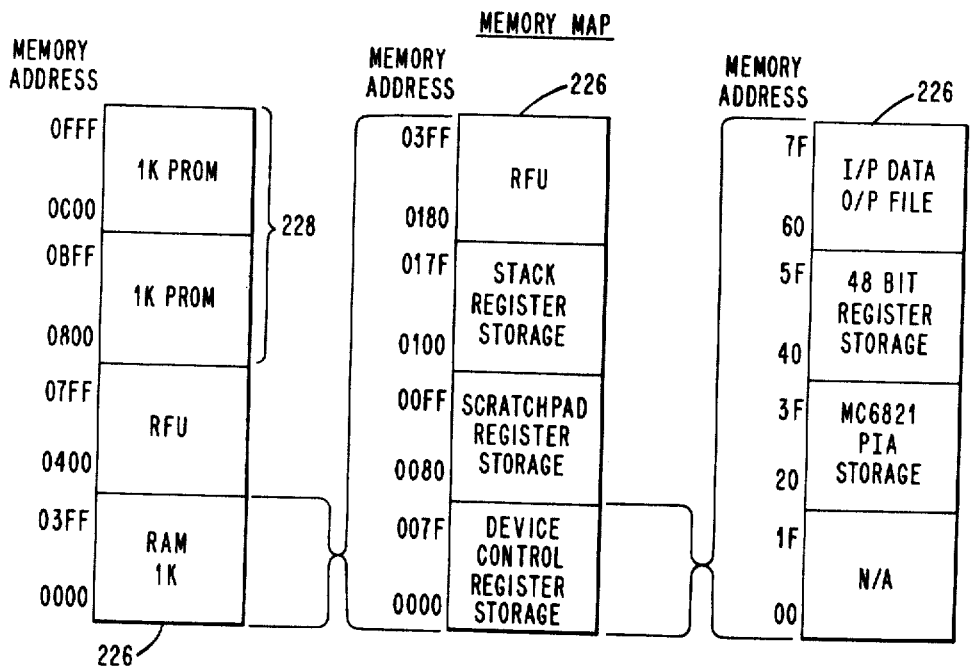
FIG. 5 shows the memory organization of the different memory units of FIG. 2.

The index register stores memory address for an index mode of memory addressing while the stack pointer register stores the next address of a next available location in an external push-down-pop-up stack included within a section of RAM 226 as shown in FIG. 5. The program counter stores the program address and condition code register stores 6 bits of condition codes indicating the result of an ALU operation. These bits are tested by MPU 224 to detect the presence of certain conditions via conditional branch instructions.

As seen from FIG. 2, the control lines of MPU 224 include: a reset ($\overline{RES}$) line which automatically resets the processor enabling it to begin an initialize routine for start-up, a data bus enable (DBE) line for enabling the data bus driver circuits, phase one ($\phi$1) and phase two ($\phi$2) clock lines which are connected to receive clocking signals from section 25, a valid memory address (VMA) line for indicating when a valid address has been applied to the address bus, and an interrupt request line ($\overline{IRQ}$) which signals the presence of an interrupt request.

The RAM 226 and PROM 228 which comprise the memory system of MPU 224 are shown in FIG. 5. The RAM 226 includes 1024 (1K) 8-bit locations and is constructed from a pair of 1024×4-bit RAM memory chips with tristate outputs such as those designated as the 2114 manufactured by Intel Corporation. The RAM is divided into the four register sections shown in FIG. 5.

The PROM 228 also includes 2048 locations and is constructed from a pair of 2048×4 bipolar PROM tristate controlled chips designated as 82S185 manufactured by Signetics Corporation and described in the publication "Signetics Bipolar & MOS Memory Data Manual", printed January, 1979. The PROM is divided into the four sections shown in FIG. 5. Each section stores the different ROM routines required for adapter operation as explained herein.

As seen from FIG. 2, the RAM 226 is enabled for writing operation when section 23 forces a chip select (CS) and write enable (WE) terminals to binary ZEROS. An 8-bit address is applied via lines A15-A8 to the first 8 address input terminals of the RAM for read out or write in of an 8-bit word applied to the chips I/O lines 1-8. An 11-bit address is applied via the lines A15-A5 to the address input terminals of the PROM while signal CPROM 100 is applied to an enabling line $\overline{CE}$ for read out of an 8-bit instruction word on lines 01-08 from the specified location. As explained herein, signal CPROM100 is generated in accordance with the state of the address signal applied to the A4 line of the address bus.

Data Control Section 23

The data control section 23 includes the selector circuits of block 230 and a peripheral interface adapter (PIA) circuit 235. The selector circuits 230 receive address input signals from the address bus of section 22 and a memory clock signal TTL00210 from section 25. The circuits 230 are operative to generate a number of control enabling signals which are distributed to the different sections as shown. The PIA circuit 235 connects to MPU 224 via the data bus through lines D0-D7 and includes two separate sets of 8-bit bidirectional interface lines. Certain ones of interface lines PB0-PB3 apply signals COUNTA10-D10 to section 24 while the remaining lines PB4-PB7 are connected to receive signals DATSRQ10 through IPDATA10 generated by the interface circuits of block 210. The interface lines PA0-PA7 are connected to apply signals APIA0010-0710 to section 24.

The PIA circuit 235 is a MC6821 PIA circuit manufactured by Motorola Inc. and is described in detail in the above-referenced publication as well as in U.S. Pat. No. 4,145,751 issued Mar. 20, 1979. Each set of interface lines of the PIA circuit 235 includes a peripheral data register, a data direction register and a control register. The peripheral data register serves as an interface register while the data direction register is used to control the direction of data transfer.

As seen from FIG. 2, the circuit 235 also includes the following control lines: chip select lines CS0, CS1 and line $\overline{CS2}$ which receive address signals BIAD1310, BIAD1210 from MPU 223 and an enabling signal EN682100 from the circuits of block 230, an enable line which is connected to receive a timing signal TTL00210 from section 25, a read/write line (R/W) which is connected to receive a signal BIRW00 from the circuits of block 230 used for specifying the direction of transfers on the data bus, a pair of interrupt request lines, $\overline{IRQA}$ and $\overline{IRQB}$, for applying interrupt requests to MPU 224, a pair of interrupt input lines, CA1 and CB1, which are used to set interrupt indications within the PIA control registers, a pair of peripheral control lines, CA2, CB2, each line being used as either an external interrupt input line or peripheral output line as a function of the contents of the control register associated therewith and a pair of register select lines RS0, RS1, which are connected to receive address signals BIAD1510 and BIAD1410 from the address bus. These lines in conjunction with the control registers select the particular register within PIA 235 that is to be written into or read out. The PIA circuit 235 is enabled for operation when MPU 224 forces lines CS0 and CS1 to binary ONES and line $\overline{CS2}$ to a binary ZERO.

Time of Day Counter Section 24

The time of day counter section 24 includes a 48-bit time of day counter 248 which couples to one kilohertz crystal controlled clock circuit of block 249, a 48-bit latch register 246, a plurality of inverter-driver circuits of blocks 242, 244 and 246 and the data selector circuits of block 241 connected as shown. The time of day counter 248 includes 12, 4 bit counter chip circuits connected in series to form a 48-bit counter. As discussed herein, the counters are constructed from the 4 bit binary counters designated as MC 14526B, manufactured by Motorola Inc. The 48-bit latch register 246 includes eight 8 bit shift registers which connect in parallel as explained herein. The shift registers are constructed from 9-bit static shift registers designated as MC 14021B manufactured by Motorola Inc.

The one megahertz clock circuits of block 249 include a 16 kilohertz crystal controlled oscillator 2492 which generates a 16 KHZ square wave timing signal, a series coupled divide by 16 countdown counter circuit 249-1 which divides the 16 KHZ signal to a 1 KHZ timing signal and a series connected NAND gate 249-0 which applies an inverted 1 KHZ square wave signal to the input of counter 248. The 1 KHZ square wave signal decrements the time of day counter 248 at a one millisecond rate when an inhibit clock signal CNTINH10 applied to an inhibit input terminal is a binary ZERO. The input terminal is connected to ground via a 1.2 kilohm resistor as shown thereby enabling the counter 248.

As seen from FIG. 2, the counter 248 receives data input signals from PIA235 via the inverter/driver circuits 242. The inverter/driver circuits 244 are connected to apply a plurality of loading signals LDCNTU-Z to counter 48 which are generated by the data selector circuits of block 241. The output signals TIME00-07 through TIME50-57 from counter 48 are applied as inputs to 48-bit latch register 246 which is connected to receive a latch control command signal LATCH10 from the circuits 241 and an enabling control signal WDENBL00 from selector circuits 230. The output signals DBIT00-07 from different stages of the shift registers of latch register 246 are, in turn, applied to the data bus via the inverter-driver circuits of block 247 when the circuits are enabled by signal WDENBL00. Each of the inverter-driver circuits of blocks 242, 244 and 247 are constructed from inverted data output driver circuits with tristate outputs designated as SN74368 manufactured by Texas Instruments Inc.

SECTION 25

The section 25 includes the clock circuits which are constructed from the MC6875 clock chip manufactured by Motorola Inc. The chip in response to the clocking signal CLKSIG10 applied to its input EXTIN, generates two phase nonoverlapping phase 1 and phase 2 clock signals on the $\phi1$ and $\phi2$ output lines in addition to a separate $\phi2TTL$ output signal which is applied at the MEMCLK output. The $\phi1$ and $\phi2$ clocking signals synchronize MPU operations in the following manner. During normal operation, when the phase 1 ($\phi1$) clock signal is forced to a binary ONE, the contents of the MPU program counter are applied to the address bus. At this time, the VMA line switches to a ONE indicating a valid address. On the trailing edge of the $\phi1$ clock signal, the program counter contents are incremented by one. When the φ2 clock signal is a binary ONE, the data from the addressed memory location is placed on the data bus and during the trailing edge of the φ2 signal, the data is latched into MPU 224. This sequence of operations occur within the MPU 224 each time the MPU addresses a memory location and transfers the data contents to a register within the MPU.

DETAILED DESCRIPTION OF PREFERRED EMBODIMENT OF ADAPTER 20

Figure 3A:
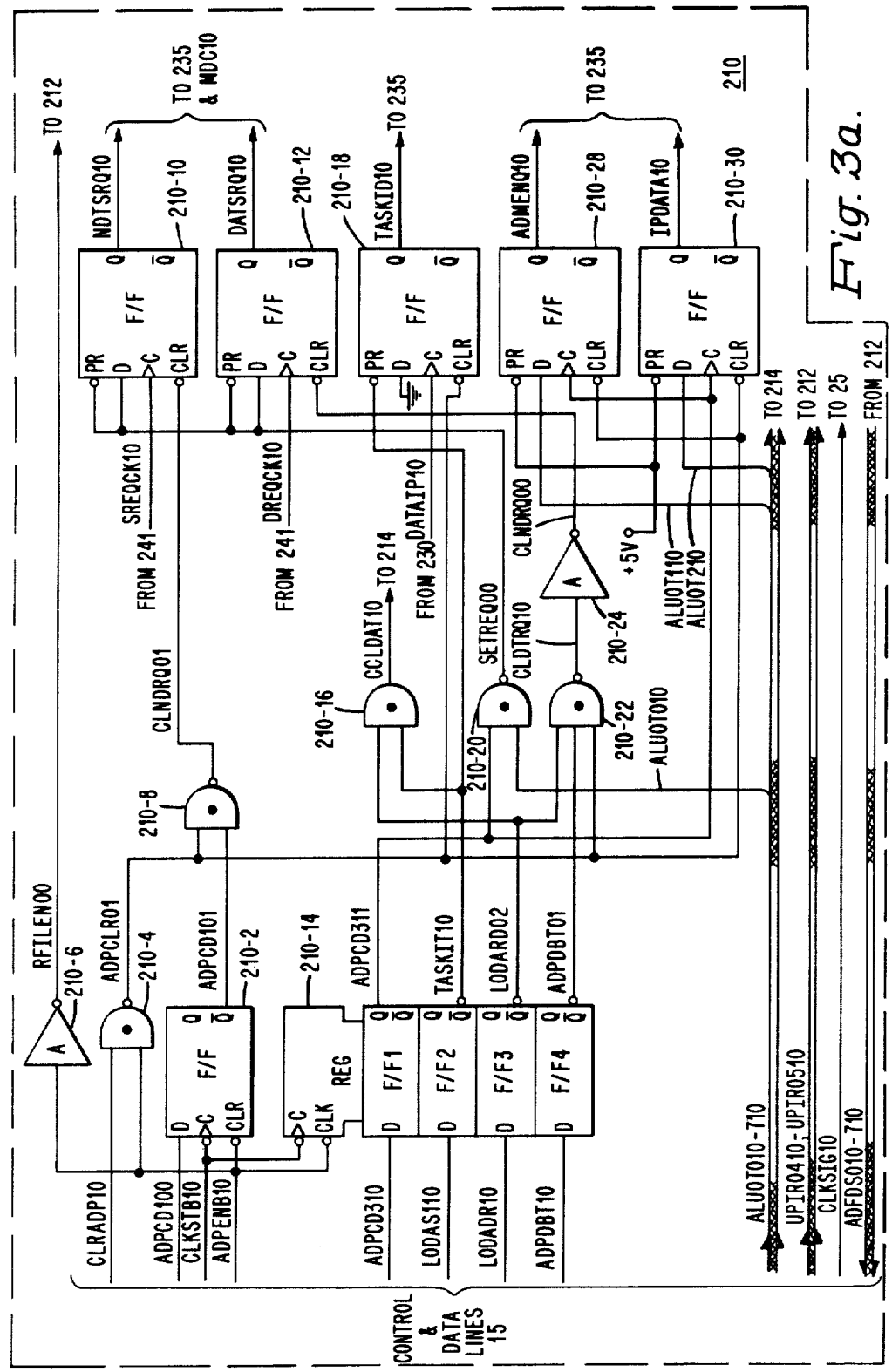

The different sections of FIG. 2 will now be described in greater detail with reference to FIGS. 3a–3c and 4. Referring first to FIG. 3a, it is seen that the signals from different ones of the control and data lines 15 are applied as inputs to the MDC adapter interface circuits of block 210. Also, other ones of the signals from the lines 15 are distributed to other sections of FIG. 2.

Figure 4:
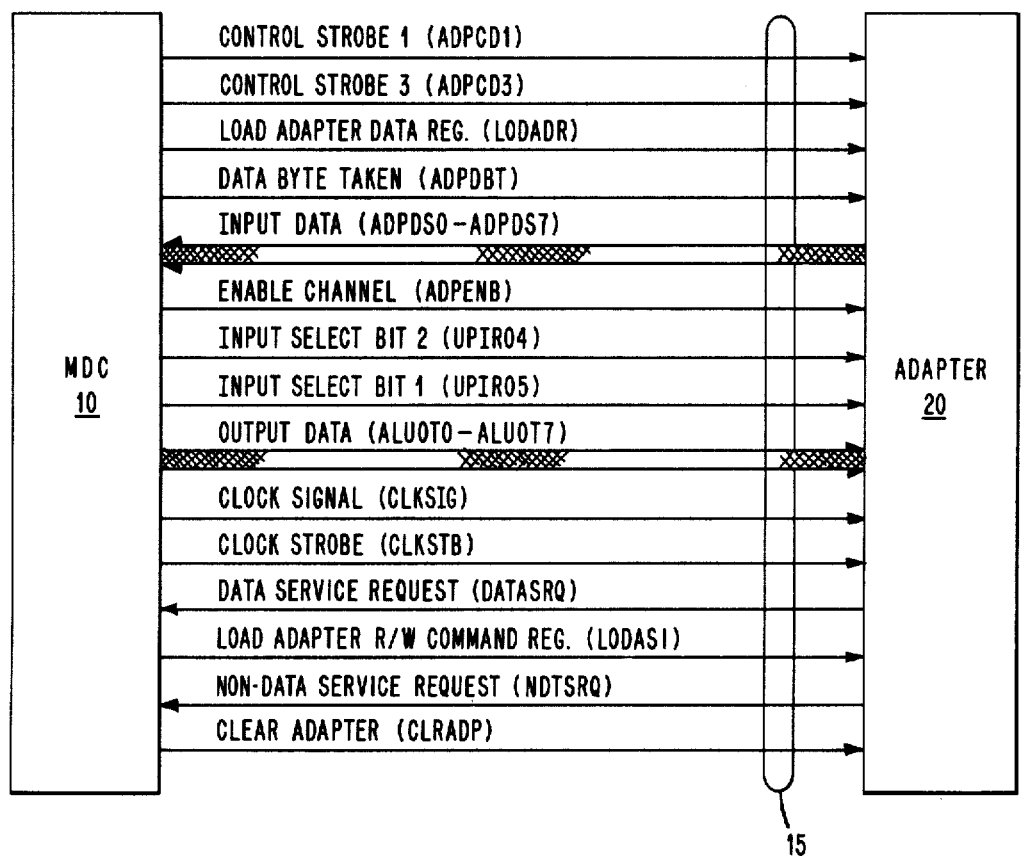
FIG. 4 shows in detail the interface between controller 10 and adapter 20 of FIG. 1.

As shown in FIG. 4, the interface lines include a control strobe 1 line (ADPCD1), a control strobe 3 line (ADPCD3), a load adapter data register line (LOADADR), a data byte taken line (ADPDBT), a plurality of input data byte lines (ADPDS0-S7), an enable channel line (ADPENB), a pair of input select lines (UPIR04, UPIA05), a plurality of output data byte lines (ALUOT0-T7), an MDC clock signal line (CLKSIG), an MDC clock strobe line (CLKSTB), a data service request line (DATSRQ), a load adapter read/write command register line (LODAS1), a non-data service request line (NDTSRQ), and a clear adapter line (CLRADP).

The description of the interface lines is given in greater detail in the section to follow.

| DESIGNATION | DESCRIPTION |
|---|---|
| ADPCD1 | The control strobe 1 line is a unidirectional line which extends from MDC10 to adapter 20. When set to a binary ONE, it resets to a binary ZERO, a non-data service request indicator flip-flop (NDTSRQ). |
| ADPCD3 | The control strobe 3 line is a unidirectional line which extends from MDC10 to adapter 20. When set to a binary ONE, this line in accordance with the states of lines ALUOT0-2 sets different indicator flip-flops as follows: (1) With ALUOT0 set to a binary ONE, line ADPCD3 sets the NDTSRQ flip-flop and a DATSRQ flip-flop; (2) With ALUOT1 set to a binary ONE, line ADPCD3 sets an ADMENQ flip-flop; and (3) With ALUOT2 set to a binary ONE, line ADPCD3 sets an IPDATA flip-flop. |
| LODADR | The load adapter data register is a unidirectional line which extends from MDC10 to adapter 20. When set to a binary ONE, it causes an output data byte from MDC10 to be loaded into the data-in register 214. It also resets DATSRQ flip-flop to a binary ZERO. |
| ADPDBT | The data byte taken line is a unidirectional line which extends from MDC10 to adapter 20. The MDC10 forces this line to a binary ONE to a signal adapter 20 that it has taken the data byte applied to the lines ADPDS0-S7 or to signal when it has applied a data byte to lines |

-continued

| DESIGNATION | DESCRIPTION |
|---|---|
| | ALUOT0-07. |
| ADPS0-7 | The input data byte lines are unidirectional lines which extend from the adapter 20 to MDC10. These lines apply status, data or control bytes read out from register file 212 to MDC10. |
| ADPENB | The enable channel line is a unidirectional line which extends from MDC01 to adapter 20. When set to a binary ONE, the line enables the adapter 20 to recieve commands from MDC10 and transfer status information to MDC10. |
| UPIR04, UPIR05 | The input select bit 2 and input select bit 1 lines are unidirectional lines which extend from the MDC10 to adapter 20. These lines apply read select signals for read out of information from register file 212. |
| ALUOT0-7 | The data output byte lines are unidirectional lines which extend from MDC10 to adapter 20. These lines apply data and control bytes from MDC10 to adapter 20. |
| CLKSIG | The clock signal line is a unidirectional line which extends from the MDC10 to adapter 20. This line applies a 125 nanosecond width clock pulse having a frequency of 4 megahertz from MDC10 to adapter 20. |
| CLKSTB | The clock strobe line is a unidirectional line which extends from MDC10 to adapter 20. This line applies a 35-55 nanosecond width clock pulse having a frequency of 4 megahertz from MDC10 to adapter 20. |
| DATSRQ | The data service request line is a unidirectional line which extends from adapter 20 to MDC10. This line is forced to a binary ONE by adapter 20 to signal MDC10 for the transfer of an input or output data byte. |
| LODAS1 | The load adapter read/write command register line is a unidirectional line which extends from MDC10 to adapter 20. When set to a binary ONE, this line enables the most significant byte of a task word to be loaded into the data-in register 214. |
| NDTSRQ | The non-data service request line is a unidirectional line which extends from adapter 20 to MDC10. When set to a binary ONE, this line signals MDC10 of a service request to change the operational state of adapter 20. |
| CLRADP | The clear adapter line is a unidirectional line which extends from MDC10 to adapter 20. This line is used to clear the major sections of adapter 20. |

Now the different sections of adapter 20 will be discussed in greater detail with reference to FIGS. 3a–3c.

MDC INTERFACE CIRCUITS 210

Referring to FIG. 3a, it is seen that the MDC adapter interface circuits of block 210 receive signals from different ones of the interface lines 15. Signals from other ones of the lines 15 (i.e., ALUT0-7, UPIR04, UPIR05 and CLKSIG) are forwarded to other portions of adapter 20 (i.e., 212, 214 and 25).

In greater detail, a control strobe 3 signal ADPCD310 from the ADPCD3 line is applied to an input terminal of a first D type flip-flop stage of a four state register 210-14. The remaining stages are connected to receive load adapter command register signal LODAS110, the load adapter data register signal LODADR10 and the data byte taken signal ADPDBT10 from lines LODAS1, LODADR and ADPDBT lines respectively. The signals applied to the register 210-14 are loaded into the stages on the positive going edge of clock strobe signal CLKSTB10 from line CLKSTB applied to the register clock terminal. This occurs when the channel enable signal ADPENB10 applied to line ADPENB is a binary ONE. Signal ADPENB10 enables adapter 20 to communicate with MDC10 by enabling register file 210-10 by causing an inverter circuit 210-6 to force signal RFILEN00 to a binary ZERO.

The output signal ADPCD3 from ONE side of the first flip-flop is applied to one input of a NAND gate 210-20 and to the clock input terminals of a pair of D type flip-flops 210-28 and 210-30. The data bit zero signal ALUOT010 from line ALUOT0 is applied to the other input terminal of NAND gate 210-20. The output signal SETREQ00 from NAND gate 210-20 is applied to the PR and D input terminals of two other D type flip-flops 210-10 and 210-12. These correspond to the NDTSRQ and DATSRQ flip-flops whose binary ONE outputs are applied to the NDTSRQ and DATSRQ lines as well as to P terminals PB5 and PB6, respectively of PIA 235.

When signals ADPCD311 and ALUOT010 are forced to binary ONES by the MDC10, NAND gate 210-20 forces signal SETREQ00 to a binary ZERO. This, in turn, switches the NDTSRQ and DATSRQ flip-flops 210-10 and 210-12 to binary ONES. The flip-flops 210-10 and 210-12 can also be set to binary ONES by signals SREQCK10 and DREQCK10 from the circuits 241 under the control of the signals COUNTA10-COUNTD10 generated by PIA235.

As mentioned, the NDTSREQ10 signal when a binary ONE indicates an operational state change in adapter 20 while the signal DATSRQ10 when a binary ONE indicates a data transfer request.

The above action occurs in response to a status request from unit 14. That is, the central processing unit 14 through software can request a status report from adapter 20 by applying a function code having a value of 18 to the MDC10. The MDC10, under microprogram control, forces signals ADPCD310 and ALUOT10 to binary ONES and then resets DATSRQ flip-flop to a binary ZERO for a status request. The MDC10 in response to these signals is operative to set the register file 214 read select lines UPIR04 and UPIR05 to a binary ONE and a binary ZERO respectively for read out of the register file status word information applied on lines ADFDS0-7 via the interface circuits 210. The status byte received by MDC10 indicates the state of adapter 20 at the last interrupt and whether the adapter is in a ready state (i.e., available for a data byte transfer) or indicates various error/interrupt conditions.

As seen from FIG. 3a, the ADPCD100 signal from the ADPCD1 control strobe line is applied to the D input terminal of D type flip-flop 210-2. This signal, when a binary ONE, sets the flip-flop 210-2 to a binary ONE on the positive going edge of clock strobe pulse CLKSTB10 from MDC10 when signal ADPENB10 is a binary ONE. The binary ZERO output signal ADPCD101 from flip-flop 210-2 is applied as one input of an AND gate 210-8. This causes AND gate 210-8 to force output signal CLNDRQ00 to a binary ZERO which resets NDTSRQ flip-flop 210-10 to a binary ZERO via its CLR input terminal.

As seen from FIG. 3a, the data bit one signal ALUOT110 from line ALUOT1 is applied to the D input terminal of the flip-flop 210-28. When signal ALUOT110 is a binary ONE, it causes flip-flop 210-28 to switch to a binary ONE on the positive going edge of signal ADPCD311. The binary ONE output signal ADMENQ10 from flip-flop 210-28 is applied to PB6 terminal of PIA235. This permits PIA235 to sample the state of DATSRQ flip-flop 210-12.

The data bit two signal ALUOT210 from line ALUOT2 is applied to the D input terminal of flip-flop 210-30. When signal ALUOT210 is a binary ONE, it causes flip-flop 210-30 to switch to a binary ONE on the positive going edge of signal ADPCD311. The binary ONE output signal IPDATA10 is applied to the PB7 terminal of PIA235. This line is used to monitor the state of the IPDATA flip-flop.

The output signal LODARD02 from the binary ZERO side of the third stage of register 210-14 is applied to one input of an AND gate 210-16. When signal LOARD02 is forced to a binary ZERO, AND gate 210-16 forces signal CCLDAT10 to a binary ZERO. The negative going edge of this signal applied to the CK input terminal of data-in register 214 of FIG. 2 loads the data byte applied to lines AULUOT0-7 into the register.

Also, as seen from FIG. 3a, signal LODARD02 resets DATSRQ flip-flop 210-12 via a NAND gate 210-22 and inverter circuit 210-24. That is, when signal LODARD02 switches to a binary ZERO, it causes NAND gate 210-22 to force signal CLDTRQ10 to a binary ONE. This, in turn, causes inverter circuit 210-24 to force signal CLNDRQ00 to a binary ZERO which clears DATSRQ flip-flop 210-12 to a ZERO. The above switching of the LODADR line takes place in response to the adapter switching of the DATSRQ flip-flop 210-12 which remains set until the data byte has been loaded into data in register 214.

The binary ZERO side of the second stage of register 210-14 switches to a binary ZERO when signal LODAS110 from line LODAS1 is a binary ONE. The signal TASKIT10 is applied as a second input to AND gate 210-16 and causes it to force signal CCLDAT10 to a binary ZERO. This, in turn, enables a task word byte to be loaded into the data-in register 214 of FIG. 2. Also, signal TASKIT10 causes a flip-flop 210-18 to switch to a binary ONE in response to signal DATAIP10. The binary ONE output signal TASKID10 applied to the CA1 input terminal of PIA235 of FIG. 2 signals an interrupt. This sets the interrupt indicator (bit 7) in control register A which, in turn, forces the INTREQ00 signal to a binary ZERO which interprets MPU224. This action is carried out in response to each task generated by software and forwarded via the MDC10 to adapter 20. The MPU224 branches to an interrupt handler routine stored in PROM 228 which, in turn, interrogates the PIA control registers and the branches to a task table routine which decodes the task command. This is followed by a branch to the appropriate ROM routine for executing the specified task as explained herein.

The fourth stage of register 210-14 is switched to a binary ONE by MDC10 when the MDC10 has taken the data byte applied to the ADFDS0-7 lines. The binary ZERO signal ADPDBT01 when forced to a binary ZERO causes the DATSRQ flip-flop 210-12 to be reset to a binary ZERO. Resetting takes place via the NAND gate 210-22 and inverter circuit 210-24.

The signal CLRADP10 applied to the line CLRADP when set to a binary ONE resets the NDTSRO flip-flop 210-10, the DATASRQ flip-flop 210-12, the TASKID flip-flop 210-18, the ADMENQ flip-flop 210-28 and IPDATA flip-flop 210-30 to binary ZEROS when the adapter 20 is enabled (i.e., signal ADPENB10 is a binary ONE). The signals ADPENB10 and CLRADP10 cause NAND gate 210-4 to switch signal ADPCLR01 to a binary ZERO. This, in turn, forces signals CLNDRQ01 and CLNDRQ00 to binary ZEROS which together with signal ADPCKR01 clear the flip-flops to ZEROS.

Each of the flip-flops may take the form of circuits disclosed in the above referenced Texas Instrument Inc. publication. For example, the flip-flops 210-10, 210-12, 210-18, 210-28 and 210-30 may be constructed from SN74LS74 chips while the flip-flop 210-1 and register 210-14 may be constructed from SN74S175 chips.

SELECTOR CIRCUITS 230

Figure 3B:
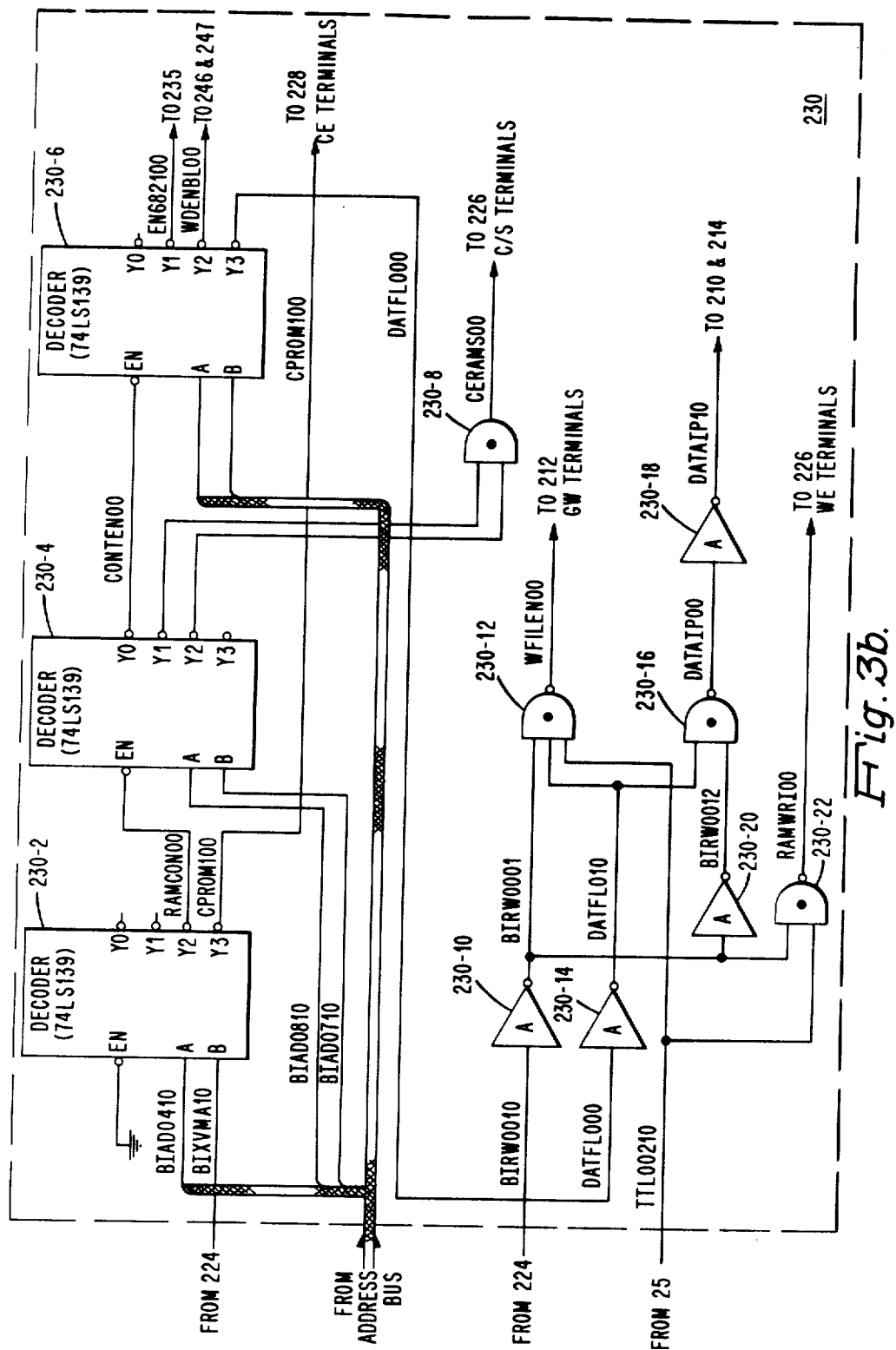

FIG. 3b shows in greater detail, the selector circuits 230 of FIG. 2. Referring to that Figure, it is seen that circuits 230 include a plurality of decoder circuits 230-2, 230-4 and 230-6, a number of inverter circuits 230-10, 230-14, 230-18 and 230-20 and a number of NAND-/AND gates 230-12, 230-16, 230-22 and 230-8. The selector circuits 230 receive MPU address signals BIAD0410, BIAD0710, BIAD0810, BIAD0910 and BIAD1010 from the address bus in addition to valid address signal BIXVMA10 from MPU 224. Pairs of these signals are applied to the input select terminals A and B of each of the decoder circuits 230-2 through 230-6, as shown.

When signals BIAD0410 and BIXVMA10 are forced to binary ONES, decoder circuit 230-2 forces signal CPROM100 at its Y3 terminal to a binary ZERO. This signal selects or enables PROM 228. When signal BIAD0410 is a binary ZERO and signal BIXVMA10 is at a binary ONE, decoder circuit 230-2 forces signal RAMCON00 to a binary ZERO. This, in turn, enables decoder circuit 230-4.

Signals BIAD0810 and BIAD0710 are applied to the A and B select input terminals of decoder circuit 230-4. They cause AND gate 230-8 to force signal CERAMS00 to a binary ZERO when either signal is a binary ONE. When signal CERAMS00 is a binary ZERO, RAM 226 is enabled to perform a read or write cycle of operation. When signals BIAD0810 and BIAD0710 are both binary ZEROS, decoder circuit 230-4 forces output signal CONTEN00 to a binary ZERO. This, in turn, enables decoder circuit 230-6.

The signals BIAD1010 and BIAD0910 are applied to the A and B select input terminals of decoder circuit 230-6. When signal BIAD1010 is a binary ONE and signal BIAD0910 is a binary ZERO, decoder circuit 230-6 forces output signal EN682100 to a binary ZERO. This signal, as mentioned, is applied to the CS2 terminal of PIA235. When signal EN682100 is a binary ZERO and the signals BIAD1310 and BIAD1210 applied to the CS0 and CS1 terminals of PIA235 are forced to binary ONES by MPU224, this addresses PIA235 of FIG. 2.

When signal BIAD1010 is a binary ZERO and signal BIAD0910 is a binary ONE, decoder circuit 230-6 forces signal WDENBL00 to a binary ZERO. As mentioned, this signal is applied to the clock input terminal of latch register 246 of FIG. 2 for loading the output signals from counter 248 into register 246 or shift the contents of register 246 on the negative going edge of signal WDENBL00 when signal LATCHT10 is a binary ONE. Signal WDENBL00, applied to the enable terminals of the driver/inverter circuits 247 when a binary ZERO, applies the signals on lines DBIT00-07 to the data bus lines LBDT00-7.

When signals BIAD1010 and BIAD0910 are both binary ONES, decoder circuit 230-6 forces signal DATFL000 to a binary ZERO. Signal DATFL000 is inverted by inverter circuit 230-14 and applied as one input to NAND gate 230-12. When MPU224 is in a write state (i.e., set from a write operation), it forces signal BIRW0010 to a binary ZERO. This signal is inverted by inverter circuit 230-10 and applied as another input to NAND gate 230-12. When signals BIRW0001 and DATFL010 are both binary ONES, NAND gate 230-12 generates signal WFILEN00 in response to clock signal TTL00210 from section 25. When signal WFILEN00 is a binary ZERO, it enables register file 212 for a write cycle of operation.

Additionally, clock signal TTL00210 and signal BIRW0001 are applied to NAND gate 230-22. When binary ONES, these signals cause NAND gate 230-22 to force signal RAWWRI00 to a binary ZERO. This, in turn, enables RAM226 for a write cycle of operation.

When MPU224 is in a read state, signal BIRW0010 is a binary ONE. This causes signal BIRW0012 from inverter circuit 230-20 to be a binary ONE. With signal DATFL010 a binary ONE, this causes NAND gate 230-16 to force signal DATAIP00 to a binary ZERO. When inverted by inverter circuit 230-18, signal DATAIP10 is forced to a binary ONE. This signal enables the data-in register 214 to apply output signals to the lines LBDT00-07 of the data bus as seen from FIG. 2. Also, the signal DATAIP10 applied to the clock terminal of the TASKID flip-flop of FIG. 3a is used to reset the flip-flop to a binary ZERO state.

TIME OF DAY COUNTER SECTION 24

FIG. 3c shows in greater detail, the time of day counter section 24. Referring to the FIG. 3c, it is seen that a number of the 8 static shift register circuits 246-1 through 246-8 which comprise the 48-bit latch register 246 are shown. Different sets of timing output signals from the time of day counter 248 are applied to each of the static shift registers. For example, signals TIME0000 through TIME5000 corresponding to a first bit (most significant bit) of each of the 6 bytes are applied to register 246-1 while signals TIME0700 through 5700 corresponding to the last bit (least significant bit) of each of the 6 bytes are applied to register 246-8. The remaining bits of the bytes are applied to the other registers, not shown. The output of the most significant stage of each of the registers 246-1 through 246-8 are applied to the lines DBIT00-7. As discussed herein, this arrangement enables the successive read out of bytes using a single address which results in the generation of clock signal WDENBL00.

Signal LATCH10 generated by the selector circuits 230 is applied to the P/S terminal of each of the registers 246-1 through 246-8. When at a binary ONE, signal LATCH10 loads signals TIME0000-5700 into registers 246-1 through 246-8 on the positive going edge of clock signal WDENBL00. At that time, the low order byte signals DBIT0100 through DBIT0700 are available on lines DBIT-0-07. Also, when signal LATCH10 is a binary ONE, this results in shifting the data byte bit contents of registers 246-1 through 246-8 one byte position for each positive going edge of clock signal WDENBL00 thereby enabling each byte to be successively applied to lines DBIT00-07, in response to a series of clock signals.

FIG. 3c shows several of the twelve counter circuits 248-1 through 248-12 which comprise time of day counter 248. Each of the counter circuits 248-1 through 248-12 connect to the ODAT00-07 lines for loading different ones of the sets of the byte signals into counter circuits 248-1 through 248-12 transferred from MDC10 by PIA235. For example, it is seen that counter circuits 248-1 and 248-2 connect in series and store the byte signals of the least significant byte of the time of day counter contents. The most significant byte of the time of day counter is stored by series connected counter circuits 248-11 and 248-12. The remaining counter circuits, not shown, store the other bytes. The clock pulse signal 1KHZCK10 which is applied to the clock input terminal of counter circuit 248-1 goes positive every millisecond. This signal causes a count of one to be added to the low order bit position of counter circuit 248-1 every millisecond effective in incrementing the time of day count by one as long as inhibit signal CNTINH10 is a binary ZERO.

It will be noted that signal LMCNTU10 is applied to the preset enable (PE) terminals of the counter circuits 248-1 and 248-2. Similarly, signals LMCNTV10, LMCNTW10, LMCNTX10, LMCNTZ10 are applied to the PE terminals of counter circuits 248-3 and 248-4, 248-5 and 248-6, 248-7 and 248-8 and 248-9 and 248-10, not shown. Lastly, signal LMCNTZ10 is applied to the PE terminals of counter circuits 248-11 and 248-12.

As explained herein, the load signals are generated by the data selector circuits 241 in response to the signals COUNTA10 through COUNTD10 from PIA235. When each of the signals LMCNTU10 through LMCNTZ10 is a binary ONE, it enables the corresponding one of the counter circuits to be loaded with the byte signals applied to the lines ODAT00-07. For example, signal LMCNTU10 enables the loading of the least significant byte while signal LMCNTZ10 enables the loading of the most significant byte. In this manner, counter circuits 248-1 through 248-12 store the number of milliseconds which elapsed since Jan. 1, 1901 and will overflow after 136 years.

Referring to FIG. 3c, it is seen that the data selector circuits 241 include a pair of binary to octal decoder circuits 241-2 and 241-6. This signals COUNTA10 through COUNTC10 are applied to the select input terminals A through C respectively of each of the decoder circuits 241-2 and 241-4. The signal COUNTD10 is applied to the G2A and G2B enable terminals of decoder circuit 241-2 and to the G1 enable terminal of decoder circuit 241-4.

The decoder circuit 241-2 is enabled for operation when signal COUNTD10 is a binary ZERO while decoder circuit 241-4 is enabled for operation when signal COUNTD10 is a binary ONE. Each of the decoder circuits 241-2 and 241-4 is conventional in design and may be constructed from chips such as the SN74LS138 manufactured by Texas Instruments Inc.

In operation, the decoder circuit 241-2 forces output signal SREQCK10 to a binary ZERO when signals COUNTA10 through COUNTC10 have the value "001". As mentioned, this signal is applied to the clock terminal of NDTSRQ flip-flop 210-10 of FIG. 3a which resets on the positive going edge of the SREQCK10 signal.

The decoder circuit 241-2 forces output signal DREQCK10 to a binary ZERO when signals COUNTA10 through COUNTC10 have the value "010". The signal DREQCK10 as mentioned previously is applied to the clock terminal of the DATSRQ flip-flop 210-12 of FIG. 3a which resets on the positive going edge of the DREQCK10 signal.

When the signals COUNTA10 through COUNTC10 have the value "011", decoder circuit 241-2 forces output signal LATCH10 to a binary ZERO. This signal after being inverted by inverter circuit 241-6 is applied to the P/S terminals of registers 246-1 through 246-8 for conditioning the registers for a parallel load or serial shift mode of operation. For the purposes of the present invention, the remaining output signals may be omitted.

When the decoder circuit 241-4 is enabled for operation, it forces corresponding ones of the signals LDCNTU00 through LDCNTZ00 to binary ONES in response to signals COUNTA10 through COUNTC10 having the values "001" through "110". The signals LDCNTU00 through LDCNTZ00 are applied to the inverter driver circuits 244 of FIG. 2 and result in the generation of signals LMCNTU100 through LMCNTZ100 respectively. As mentioned, these signals are used to load different ones of the counter circuits 248-1 through 248-6.

DESCRIPTION OF OPERATION

With reference to FIGS. 1 through 5, the ROM routines and memory tables set forth herein, the operation of the preferred embodiment of the present invention will now be described. First, the ROM routines and memory tables will be discussed briefly. The line numbers are used merely for reference. Lines 1000-6000 illustrate in greater detail the register storage within MPU224. Lines 7000-8500 illustrate in greater detail the register storage of PIA235. Lines 8700-11800 illustrate the different permanently assigned locations within RAM 226 shown in FIG. 5 which are utilized by MPU224. Lines 149400 through 196400 illustrate the ROM routines and table within PROM228 of FIG. 5 pertinent to the present invention.

The above mentioned tables and ROM routines referenced herein are as follows.

|      | MC6800 STORAGE |                  |
|------|----------------|------------------|
| 1000 |                |                  |
|      |                |                  |
| 2300 | REG IX(16 BITS) | INDEX REGISTER  |
| 2400 | REG PC(16 BITS) | PROGRAM COUNTER |
| 2500 | REG SP(16 BITS) | STACK POINTER   |

-continued

| | | | |
|---|---|---|---|
| 2600 | REG A (8 BITS) | | ACCUMULATOR A |
| 2700 | REG B (8 BITS) | | ACCUMULATOR B |
| 2800 | REG CCR(6 BITS) | | CONDITION CODE REG |
| 2900 | REG HADD(16 BITS) | | HIGH ADDRESS |
| 3100 | SREGH = CCR(0) | | HALF ADD INDICATOR |
| 4600 | VEC IRQ | | INTERRUPT REQUEST LINE |
| 6000 | | | |

| | MC6821 STORAGE | | |
|---|---|---|---|
| 7000 | CONSTANT PIADDRA | = 2C# | DATA DIRECTION REG. PORT A |
| 7100 | CONSTANT PIAORA | = 2C# | OUTPUT REG. PORT A |
| 7200 | CONSTANT PIACRA | = 2D# | CONTROL REG. PORT A |
| 7300 | CONSTANT PIAADDRB | = 2E# | DATA DIRECTION REG. PORT B |
| 7400 | CONSTANT PIAORB | = 2E# | OUTPUT REG. PORT B |
| 7500 | CONSTANT PIACRB | = 2F# | CONTROL REG. PORT B |
| 8100 | CONSTANT MDCRG | = 60# | DATA REG TO/FROM MDC |
| 8200 | CONSTANT IDRG | = 61# | ID STORAGE REG. |
| 8300 | CONSTANT STATRG | = 62# | STATUS REG. |
| 8400 | CONSTANT TSKRG | = 63# | TASK REGISTER |
| 8500 | CONSTANT WDENBL | = 40# | READ TIMER BUFFER. |

| | DATA CONSTANTS USED WITH ADDRESS | | |
|---|---|---|---|
| | CONSTANT | = 2E | |
| 7700 | CONSTANT NDSRQ | = 01# | NON DATA SERVICE REQUEST |
| 7800 | CONSTANT DSRQ | = 02# | DATA SERVICE REQUEST CODE |
| 7900 | CONSTANT LATCH | = 03# | LATCH CNTR TO BUFFERS |
| 8000 | CONSTANT ICLKCNTR | = 05# | INC. CLOCK CNTR |

| | RAM STORAGE 226 | | |
|---|---|---|---|
| 8700 | CONSTANT MDCXCNTR | = 80# | TRANSFER CNTR |
| 8800 | CONSTANT XFRBUF1 | = 81# | TRANSFER BUFFER 1 (MSB) |
| 8900 | CONSTANT XFRBUF2 | = 82# | TRANSFER BUFFER 2 |
| 9000 | CONSTANT XFERBUF3 | = 83# | TRANSFER BUFFER 3 |
| 9100 | CONSTANT XFERBUF4 | = 84# | TRANSFER BUFFER 4 |
| 9200 | CONSTANT XFERBUF5 | = 85# | TRANSFER BUFFER 5 |
| 9300 | CONSTANT XFERBUF6 | = 86# | TRANSFER BUFFER 6 (LSB) |

| | | | |
|---|---|---|---|
| 11300 | CONSTANT TSKTBLH | = B0# | TASK TABLE LOOK UP HO |
| 11400 | CONSTANT TSKTBLL | = B1# | TASK TABLE LOOK UP LO |
| 11500 | CONSTANT TSKRAH | = B2# | TASK ROUTINE ADDRESS HO |
| 11600 | CONSTANT TSKRAL | = B3# | TASK ROUTINE ADDRESS LO |

11800

PROM 228

| LINE # | | | | ADDRESS (HEX) | IMAGE (HEX) |
|---|---|---|---|---|---|
| 149400 | DIALOGUE BETWEEN TIMER AND MDC ROM ROUTINE | | | | |
| 149500 | $TMRMDC10 | LDA (A,PIAORB) | READ B PORT | 8FF 900 | 96 2E |
| 149600 | $ | BITI(A,40#) | EXAMINE FOR ADAPTER ENABLE | 901 902 | 85 40 |
| 149700 | $ | BEQ ($MDCIOERR) | ERROR SECT | 903 904 | 27 0E |
| 149800 | $ | LDAI(B,DSRQ) | DATSRQ CODE | 905 906 | C6 02 |
| 149900 | $ | STA(B,PIAORB) | SETS DATA SERVICE REQ | 907 908 | D7 2E |
| 150000 | $ | CLRE(PIAORB) | TERMINATE | 909 90A 90B | 7F 00 2E |
| 150100 | $TMRMDC11 | LDA (A,PIAORB) | READ B PORT | 90C 90D | 96 2E |
| 150200 | $ | BITI(A,10#) | DATA SERVICE REQUEST | 90E 90F | 85 10 |
| 150300 | $ | BNE ($TMRMDC11) | NOT FINISHED | 910 911 | 26 FA |

-continued

| 150400 | $ | RTS | | 912 | 39 |
|---|---|---|---|---|---|
| 152200 | INPUT FROM MDC ROM ROUTINE | | | | |
| 152300 | $IPMDC00 | LDXI(0000#) | STARTING ADDRESS OF BUFFER | 926 927 928 | CE 00 00 |
| 152400 | $IPMDC01 | STA (A,MDCXCNTR) | NUMBER OF TRANSFERS | 929 92A | 97 80 |
| 152500 | $IPMDC10 | BSR ($TMRMDC10) | BETWEEN TIMER & MDC | 92B 92C | 8D D2 |
| 152600 | $ | LDA (A,MDCRG) | READ DATA REG. FROM MDC | 92D 92E | 96 60 |
| 152700 | $ | STAX (A,81#) | STORE IN BUFFER | 92F 930 | A7 81 |
| 152800 | $ | INX | MOVE BUFFER POINTER | 931 | 08 |
| 152900 | $ | DECE (MDCXCNTR) | IS TRANSFER COMPLETE | 932 933 934 | 7A 00 80 |
| 153000 | $ | BNE ($IPMDC10) | PREPARE FOR NEXT BYTE | 935 936 | 26 F4 |
| 153300 | OUTPUT TO MDC ROM ROUTINE | | | | |
| 153400 | $OPMDC00 | LDXI (0000#) | STARTING ADDRESS OFFSET OF BUFFER | 938 939 93A | CE 00 00 |
| 153500 | $OPMDC01 | STA (A,MDCCXCNTR) | NUMBER OF TRANSFERS | 93B 93C | 97 80 |
| 153600 | $OPMDC10 | LDAX(A,81#) | TAKE DATA FROM BUFFER | 93D 93E | A6 81 |
| 153700 | $ | STA(A,MDCRG) | STORE DATA IN DATA OUT FILE | 93F 93E | 97 60 |
| 153800 | $ | BSR($TMRMDC10) | BETWEEN TIMER AND MDC | 941 942 | 8D BC |
| 153900 | $ | INX | MOVE BUFFER POINTER | 943 | 08 |
| 154000 | $ | DECE (MDCXCNTR) | IS TRANSFER COMPLETE | 944 945 946 | 7A 00 80 |
| 154100 | $ | BNE ($OPMDC10) | PREPARE NEXT DATA BYTE | 947 948 | 26 F4 |
| 154200 | $ | RTS | | 949 | 39 |

PROM 228

| LINE # | TABLE-MEMORY MAP-ROM | | | ADDRESS (HEX) | IMAGE (HEX) |
|---|---|---|---|---|---|
| | TASK TABLE LOOK-UP ($TSKTBL) | | | | |
| 154600 | CONST | (FC#) | READ TIMER | B00 | FC |
| . | . | . | . | . | . |
| 156700 | CONST | (C6#) | WAKE UP ONCE | B15 | C6 |
| 156800 | CONST | (CA#) | WAKE UP AT INTERVALS | B16 | CA |
| . | . | . | . | . | . |
| 157000 | CONST | (D9#) | WAKE UP BY INTERVALS | B18 | D9 |
| 157100 | CONST | (A5#) | TASK ERROR | B19 | A5 |
| . | . | . | . | . | . |
| 157700 | CONST | (A5#) | TASK ERROR | B1F | A5 |

PROM 228

| LINE # | | | | ADDRESS (HEX) | IMAGE (HEX) |
|---|---|---|---|---|---|
| 157900 | TASK QUERY ROM ROUTINE | | | | |
| 158000 | $TASKQ010 | LDA (A,TSKRG) | READ TASK REG | B20 B21 | 96 63 |
| 158100 | $ | ANDI (A,1F#) | SAFEGUARD | B22 B23 | 84 1F |
| 158200 | $ | STA (A,TSKTBLL) | LO ADD OF TASK TABLE | B24 B25 | 97 B1 |

-continued

| | | | | | |
|---|---|---|---|---|---|
| 158300 | $ | LDX (TSKTBLH) | TASK ADDRESS LO CONSTANT | B26 B27 | DE B0 |
| 158400 | $ | LDAX (A,00#) | TASK LO CONSTANT | B28 B29 | A6 00 |
| 158500 | $ | STA (A,TSKRAL) | TASK ROUTINE ADDRESS LO | B2A B2B | 97 B3 |
| 158600 | $ | LDX (TSKRAH) | TASK ROUTINE ADDRESS | B2C B2D | DE B2 |
| 158700 | $ | JMPX (00#) | TO ROUTINE DESIGNATED BY BASE LOC. AND TASK NO. | B2E B2F | 6E 00 |
| 158900 | INTERRUPT HANDLER QUERY ROM ROUTINE | | | | |
| 159000 | $IHQ010 | LDA (A,PIACRB) | READ PIA CTRL REG B | B30 B31 | 96 2F |
| 159100 | $ | BPL ($IHQ020) | NOT EXTERNAL INT | B32 B33 | 2A 0B |
| 159200 | $ | ORAI(A,04#) | INSURE OUTPUT REG. | B34 B35 | 8A 04 |
| 159300 | $ | STA (A,PIACRB) | | B36 B37 | 97 2F |
| 159400 | $ | LDA (A,PIAORB) | TO RESET IRQ B | B38 B39 | 96 2E |
| 159500 | $ | LDAI(A,94#) | LOAD STATUS EXT. INT. CODE | B3A B3B | 86 94 |
| 159600 | $ | JMPE ($IHQSTAT0) | RETURN LOCATION | B3C B3D B3E | 7E 08 C9 |
| 159700 | $IHQ020 | LDA (A,PIACRA) | READ PIA CTRL REG A | B3F B40 | 96 2D |
| 159800 | $ | BPL ($IHQC100) | NOT FROM MDC | B41 B42 | 2A 0A |
| 159900 | $ | ORAI(A,04#) | INSURE OUPUT REG. | B43 B44 | 8A 04 |
| 160000 | $ | STA(A,PIACRA) | | B45 B46 | 97 2D |
| 160100 | $ | LDA (A,PIAORA) | TO RESET IRQ A | B47 B48 | 96 2C |
| 160200 | $ | JSRE ($TASKQ010) | TASK INTERPRETER | B49 B4A B4B | BD 08 20 |
| 160300 | $IHQRTIOA | RTI | | B4C | 3B |
| 179200 | LOAD TIMER ROM ROUTINE | | | | |
| 179300 | $LDTIMER0 | (0D00#) | | | |
| 179400 | $ | LDAI(A,06#) | TRANSFER BYTE COUNT | D00 D01 | 86 06 |
| 179500 | $ | JSRE($IPMDC00) | INPUT FROM MDC | D02 D03 D04 | BD 09 26 |
| 179600 | $ | LDAI(A,0E#) | ADDRESS OF TIMER MSB | D05 D06 | 86 0E |
| 179700 | $ | LDXI(0081#) | STARTING ADDRESS OF BUFFER | D07 D08 D09 | CE 00 81 |
| 179800 | $LDTIMER1 | LDAX(B,00#) | DATA FOR TIMER | D0A D0B | E6 00 |
| 179900 | $ | STA (B,PIAORB) | DATA TO PIA | D0C D0D | D7 2C |
| 180000 | $ | STA (A,PIAORB) | LOAD BYTE | D0E D0F | 97 2E |
| 180100 | $ | CLRE(PIAORB) | | D10 D11 D12 | 7F 00 2E |
| 180200 | $ | INCA | ADDRESS NEXT BYTE | D13 | 4A |
| 180300 | $ | DEX | MOVE INPUT POINTER | D14 | 08 |
| 180400 | $ | CPXI(0080#) | 1 BEYOND BUFFER | D15 D16 D17 | 8C 00 80 |

-continued

| | | | | | |
|---|---|---|---|---|---|
| 180500 | S | | BNE($LDTIMER1) | D18 | 26 |
| | | | | D19 | F0 |
| 180600 | S | | RTS | D1A | 39 |
| | READ TIME ROM ROUTINE | | | | |
| 193600 | $RDTIME00 | (0DFC#) | READ TIME | DFC | 8D |
| | | BSR | SUBROUTINE | DFD | 05 |
| | | ($RDTIME10) | | | |
| 193700 | S | LDAI(A,06#) | TRANSFER | DFE | 86 |
| | | | COUNT | DFF | 06 |
| 193800 | S | JMPE | TRANSFER | E00 | 7E |
| | | ($OPMDC00) | DATA TO MDC | E01 | 09 |
| | | | SUBROUTINE | E02 | 38 |
| 193900 | TIME TO BUFFERS ROM ROUTINE | | | | |
| 194000 | $RDTIME10 | BSR | LATCH | E03 | 8D |
| | | ($RDTIME20) | TIME | E04 | 21 |
| 194100 | S | STA | STORE LSB | E05 | 97 |
| | | (A,XFRBUF6) | | E06 | 86 |
| 194200 | S | BSR | LATCH TIME | E07 | 8D |
| | | ($RDTIME20) | | E08 | 1D |
| 194300 | S | CMP | 1ST READ | E09 | 91 |
| | | (A,XFRBUF6) | WITH 2ND | E0A | 86 |
| | | | READ | | |
| 194400 | S | BEQ | BRANCH IF | E0B | 27 |
| | | ($RDTIME11) | COMPARE | E0C | 02 |
| 194500 | S | BSR | LATCH TIME | E0D | 8D |
| | | ($RDTIME20) | | E0E | 17 |
| 194600 | STORE IN RAM ROM ROUTINE | | | | |
| 194700 | $RDTIME11 | STA | STORE IN | E0F | 97 |
| | | (A,XFRBUF6) | SCRATCHPAD | E10 | 86 |
| 194800 | S | LDA | READ 5TH | E11 | 96 |
| | | (A,WDENBL) | BYTE | E12 | 40 |
| 194900 | S | STA | STORE IN | E13 | 97 |
| | | (A,XFRBUF5) | SCRATCHPAD | E14 | 85 |
| 195000 | S | LDA | READ 4TH | E15 | 96 |
| | | (A,WDENBL) | BYTE | E16 | 40 |
| 195100 | S | STA | STORE IN | E17 | 97 |
| | | (A,XFRBUF4) | SCRATCHPAD | E18 | 84 |
| 195200 | S | LDA | READ 3RD | E19 | 96 |
| | | (A,WDENBL) | BYTE | E1A | 40 |
| 195300 | S | STA | STORE IN | E1B | 97 |
| | | (A,XFRBUF3) | SCRATCHPAD | E1C | 83 |
| 195400 | S | LDA | READ 2ND | E1D | 96 |
| | | (A,WDENBL) | BYTE | E1E | 40 |
| 195500 | S | STA | STORE IN | E1F | 97 |
| | | (A,XFRBUF2) | SCRATCHPAD | E20 | 82 |
| 195600 | S | LDA | READ MSB | E21 | 96 |
| | | (A,WDENBL) | BYTE | E22 | 40 |
| 195700 | S | STA | STORE IN | E23 | 97 |
| | | (A,XFRBUF1) | SCRATCHPAD | E24 | 81 |
| 195800 | S | RTS | | E25 | 39 |
| 195900 | LATCH TIME ROM ROUTINE | | | | |
| 196000 | $RDTIME20 | LDAI(A,LATCH) | SETS UP | E26 | 86 |
| | | | LATCH TIME | E27 | 03 |
| 196100 | S | STA | LATCHES THE | E28 | 97 |
| | | (A,PIAORB) | TIME VIA | E29 | 2E |
| | | | PIA B | | |
| 196200 | S | CLRE | TERMINATES | E2A | 7F |
| | | (PIAORB) | | E2B | 00 |
| | | | | E2C | 2E |
| 196300 | S | LDA | READ LSB | E2D | 96 |
| | | (A,WDENBL) | BYTE | E2E | 40 |
| 196400 | S | RTS | | E2F | 39 |

As mentioned previously, all activity of adapter 20 is preceded or initiated by commands. These commands cause MDC10 to transfer a 16-bit word to the channel, adapter 20. The adapter utilizes one quadrant of the MDC firmware routines residing in its control store and the MDC scratchpad memory for processing and passing on the CPU commands/instructions. For further information regarding how such commands are processed by MDC10 and transferred to an adapter, reference may be made to referenced U.S. Pat. No. 4,025,906.

One of the output commands includes a function code which results in the MDC10 transferring a task word to adapter 20. As concerns the operation of the present invention, it will be assumed that the MDC10 transfers an 8-bit task word coded as $00_{16}$. This command causes the adapter 20 to read the time of day value stored in time of day counter 248.

It will be appreciated that prior to that, CPU14 had issued a command for loading the time of day counter 248 with a millisecond count referenced from the date Jan. 1, 1901 representative of the time of day (see lines 179200-180600). Normally, the millisecond binary value can be used directly or with slight modification by CPU14 to provide desired time of day information required by user programs.

MDC10 applies the task word byte $00_{16}$ to the lines ALUOT0-7 and forces line LODAS1 to a binary ONE. The signal LODAS110 is loaded into the second stage of register 210-14 of FIG. 3a, upon the positive edge or rise of clock signal CLKSTB10. The signal LODAS110 remains stored in register 210-14 for one clock interval.

The signal TASKIT10 from register 210-14 forced to a binary ZERO sets the TASKID flip-flop 210-18 to a binary ONE. It also causes AND gate 210-16 to force signal CCLDAT10 to a binary ZERO. The negative going edge or fall of signal CCLDAT10 clocks the task word byte $00_{16}$ into data-in register 214 of FIG. 2.

The binary ONE signal TASKID10 is applied to the CA1 terminal of PIA235 causes the setting of the interrupt flag bit 7 of the PIA control register A. This causes PIA235 to force its IRQ(A) terminal to a binary ZERO which results in interrupt request signal INTREQ00 being forced to a binary ZERO. As seen from FIG. 2, the interrupt signal is applied to the IRQ terminal of MPU224.

It will be assumed in this example that the MPU224 is idle executing a wait instruction sequence awaiting an interrupt. The interrupt sequence is conventional and may be considered similar to interrupt processing described in the publication "Basic Microprocessors and the 6800" referenced previously.

Upon the occurrence of the interrupt, MPU224 branches to an interrupt handler sequence for determining the cause of the interrupt as explained herein. That is, MPU224 applies address vectors $FF8_{16}$ and $FF9_{16}$ to the address bus lines BIAD05 through BIAD15. This read out the RAM location interrupt address from the specified PROM227 location which corresponds to the start of the interrupt handler routine which is going to service the interrupt. The contents of FF8 and FF9 are loaded into the program counter (PC) and thereafter applied to the address bus for fetching the first instruction of the interrupt handler routine $IHQ010 (see lines 158900-160300).

This routine includes a series of load (LDA) and branch (BPL) instructions for reading the various PIA control registers and testing for various conditions to establish the source of the interrupt.

The addresses $B30_{16}$ and $B31_{16}$ store the bytes of an LDA instruction specifying the transfer of the contents of PIA235 control register B into the accumulator of MPU224. The control register B is used for indicating an external interrupt. Since this is an interrupt from MDC10, the MPU224, under the control of the interrupt handler ROM routine, branches to address locations $B3F_{16}$ and $B40_{16}$. These locations store the bytes of another LDA instruction which calls for the transfer of the PIA235 control register A to the MPU accumulator.

In greater detail, the operand at location $B40_{16}$ contains as the byte, the value "$2D_{16}$" or $00101101_2$. When read out BIAD05-15 onto the address bus lines, the low order bits $01_2$ are applied to the signal lines BIAD14 and BIAD15 respectively. These signals applied to the RS0 and RS1 input terminals of PIA235 selects for read out, the contents of the control register A onto the data bus lines LBDT00-07. The contents are applied to the MPU224 accumulator A for testing the state of bit 7.

Since bit 7 is a binary ONE, indicating a task interrupt from MDC10, MPU224 executes a jump to subroutine (JSRE) instruction stored at the byte locations specified by addresses $B49_{16}$, $B4A_{16}$ and $B4B_{16}$. This causes MPU224 to branch to address $B20_{16}$ which is the start of the task query ROM subroutine $TASKQ010 at line 158000. During the execution of the JSRE instruction, MPU224 loads the return address bytes OB4C into successive locations of the stack storage specified by the stack pointer register contents.

It is seen that the first instruction of the $TASKQ010 routine is a LDA instruction stored at address B20. The address value $63_{16}$ contained in the instruction is applied to address bus lines BIAD05-15. This forces address signals BIAD0910 and BIAD1010 to binary ONES and signals BIAD0710 and BIAD0810 to binary ZEROS. It is seen from FIG. 3b that these signals together with signal BIXVMA10 a binary ONE enable decoders 230-4 and 230-6 and result in signal DARTFL000 being forced to a binary ZERO. This, in turn, forces signal DATAIP10 to a binary.

The task word $00_{16}$ loaded into data-in register 214 is applied to data bus lines LBDT00-07 in response to signal DATAIP10 and transferred to the MPU224 accumulator. Also, MPU224 read/write signal BIRW0010 is a binary ZERO at this time. This causes NAND gate 230-22 to force signal RAMWRI00 to a binary ZERO enabling RAM226 for a write cycle of operation.

It will be appreciated that during the initialization of adapter 20, the various register locations within RAM226 are loaded with appropriate constants. More specifically, the byte location having address $B0_{16}$ is loaded with the value "$OB_{16}$" and the location having address B2 is loaded with the value "$OD_{16}$".

As seen from line 11300, these locations store the task table loop up addresses. The task query ROM routine ($TASKQ010) after reading the task word from the task register (i.e., data-in register 214) references an AND immediate instruction at addresses B22 and B23. This causes MPU224 to "and" the contents of accumulator A (i.e., task word) with the constant value 1F for ensuring that the task word sent is valid. The result is to utilize only the low order 5 bits.

Next, MPU224 reads out a store accumulator (STA) instruction by addressing locations B24 and B25. This instruction stores the task word in the accumulator A into location having address B1 (i.e., low order address task table). The next instruction (LDX) read out of locations B26 and B27 loads the MPU224 index register. The most significant byte position of the index register (bits 8–15) is loaded with the contents of location B0 and the least significant byte position (bits 0–7) is loaded with the contents of location B1. The result is that the index register stores the value $OB00_{16}$.

Next, MPU224 fetches the load accumulator indexed (LDAX) instruction fetched from locations B28 and B29. This instruction causes the constant stored in memory location $OB00_{16}$ specified by the index register to be loaded into accumulator A. As seen from line 154600, the value $FC_{16}$ specifying the task requested by MDC10 obtained from the task table now resides in the accumulator A.

As seen from lines 158500 and 158600, a second sequence of STA and LDX instructions are fetched from the pairs of locations B2A, B2B and B2C, B2D. The STA instruction stores the accumulator value $FC_{16}$ into location B3 which corresponds to the low order bits of the task routine address (see line 11600). The LDX instruction loads the most significant byte position of index register from the contents of location B2 and the least significant byte position of the index register with the contents of location B3. At this time, the index register contains the value $ODFC_{16}$.

Next, MPU224 upon executing the jump index (JMX) instruction jumps to address DFC which begins execution of the read time ROM routine (see line 193600). From the addresses DFC and DFD, MPU224 fetches a branch (BSR) instruction. This causes MPU224 to branch to the instruction at its present location plus 2 plus hexidecimal 5 (i.e., location E03). Also, during the execution of the BSR instruction, MPU224 stores the return address values FE and OD in successive byte locations of the stack (see FIG. 5) storage of RAM226 specified by the contents of the stack pointer register (see line 2500). The stack pointer is decremented by one after each byte of the return address is loaded into the stack. For further information regarding the operations performed by MPU224 in executing the BSR instruction as well as other instructions discussed herein, reference may be made to the publication "M6800 Microcomputer System Design Data", copyrighted 1976 by Motorola, Inc.

Next, as seen from line 19400, MPU224 executes a second BSR instruction fetched from locations E03 and E04. This causes MPU224 to branch to location E26 (i.e., location E03 plus 2 plus hexidecimal 21). Again, MPU224 stores the return address values 05 and 0E in successive byte locations of the stack storage of RAM226 specified by stack pointer SP contents. The stack pointer is again decremented by one after the storage of each byte.

MPU224 now begins execution of latch time ROM routine $RDTIME20. As seen from line 196000, MPU224 addresses locations E26 and E27 for read out of a load accumulator immediate (LDAI) instruction. The execution of the LDAI instruction loads the constant value 03, stored at location E27, into the accumulator A.

Next, MPU224 executes the store accumulator (STA) instruction fetched from locations E28 and E29. During the execution of the STA instruction, the constant value 03 is applied to the data bus lines LBDT00-07 while the address value 2E is applied to the address bus lines BIAD08-15.

Referring to FIG. 3b, it is seen that the address value 2E forces address signals BIA008100 and BIA00710 to ZEROS and address signals BIAD1010 and BIAD0910 to a binary ONE and binary ZERO, respectively. Since signal BIXVMA10 is a binary ONE, decoder circuits 230 through 230-6 enable PIA signal EN682100 to a binary ZERO. This signal is applied to the CS2 terminal of PIA235.

At this time, the address signals BIAD1410 and BIAD1510 have the value "10" while the address signals BIAD1210 and BIAD1310 have the value "11". The address signals BIAD1410 and BIAD1510 are applied to the RS1 and RS0 terminals, respectively, of PIA235. The value "10", together with bit 2 of control register B, selects peripheral data register B.

It will be appreciated that during initialization, the different registers of PIA235 were loaded with appropriate constant values. For example, the direction register A is loaded to specify all output lines while control register A is loaded with the value "37". Also, the direction register B is loaded to specify lines 3-0 as output lines while control register B is loaded with the value "3F" (all ones).

Thus, in response to the execution of the STA instruction, the constant value 03 is transferred via the data bus lines LBT00-07 to peripheral data register B. This causes the constant value to be applied to the lines count A-D. This forces signals COUNTA10 and COUNTB10 to binary ONES while signals COUNTC10 and COUNTD10 are binary ZEROS.

As seen from FIG. 3c, this causes decoder circuit 241-2 to force signal LATCHT10 to a binary ONE. This enables the 48-bit latch register 246 to latch the time of day value stored in counter 248. As seen from line 196200, MPU224 executes a clear extended address (CLRE) instruction fetched from locations E2A through E2C. This clears the contents of the peripheral register B specified by address 002E to ZEROS which effectively terminates the latch operation.

Next, MPU224 executes a load accumulator (LDA) instruction fetched from locations E2D and E2E. This instruction causes the contents of the memory location having address 40 to be loaded into the A accumulator. As seen from FIG. 3b, the value "40" forces address signals BIAD0710 and BIAD0810 are binary ZEROS while signals BIAD0910 and BIAD1010 have the value "10". Since signal BIXVMA10 is a binary ONE, decoder circuits 230-2 through 230-6 force signal WDENBL00 to a binary ZERO. The signal WDENBL00 enables the least significant byte to be read out onto lines DBIT00-07 and applied via the driver/inverter circuits 247 to the data bus lines LBDT00-07. From there the least significant byte is loaded into the A accumulator of MPU224.

From the foregoing, it is seen that the sequence of the three instructions LDAI, STA and CLRE provide a pulse for latching the time of day value into latch register 246. The LDA instruction which follows, brings the LSB into the A accumulator.

Next, MPU224 fetches the return from subroutine (RTS) instruction from location E2F. Upon executing, the RTS instruction MPU224 returns to its original address plus 2. The return address is specified by the return address bytes having the values 0E05 last stored in the stack locations specified by the stack pointer. As each return address byte is removed, the stack pointer register is incremented by one. The result is that MPU224 begins the execution of the ROM routine $RDTIME10 with the fetching of the store accumulator (STA) instruction from locations E05 and E06.

As seen from line 194100, the execution of the STA instruction by MPU224 results in the least significant byte in the A accumulator being stored in buffer location 86 of the scratchpad storage of RAM226 (see line 9300). Next, MPU224 executes the branch (BSR) instruction fetched from locations E0B and E0C.

This causes MPU224 to branch to the instruction at its present location plus 2 plus hexidecimal 1D (i.e., location E26). Also, during the execution of the BSR instruction, MPU224 stores the return address values 07 and 0E in successive byte locations of the RAM226 stack specified by the stack pointer register contents. Also, the stack pointer is decremented by one after each byte of the return address is loaded into the stack.

Now, MPU224 by executing the above sequence of three instructions is going to generate a pulse which again latches the time of day value stored in counter 248. Again, the execution of the LDA instruction by MPU224 transfers the least significant byte into the A accumulator by the generation of signal WDENBL00. Next, MPU224 executes the RTS instruction which returns MPU224 to the next instruction following the BSR instruction started at location 0E09.

As seen from line 194300, this causes MPU224 to fetch the compare (CMP) instruction stored at locations E09 and E0A. The execution of this instruction compares the two bytes by having MPU224 to subtract the least significant byte of contents stored at memory location 86 (the first read byte) from the least significant byte stored in the A accumulator (the second read byte) for the purpose of setting the Z indicator when the result is zero (i.e., the two bytes are equal).

MPU224 then fetches the branch if equal (BEQ) instruction at locations E0B and E0C. With this instruction, MPU224 tests the state of the Z indicator bit of the condition code register. Assuming that the two bytes are equal (Z=1), MPU224 branches to location E0F, the start of ROM routine $RDTIME11 (i.e., present location plus hexidecimal 2). This means that the time of day value latched into register 246 from counter 248 was accurately read (i.e., not read at a time when it was being updated).

As seen from lines 194700 through 195700, MPU224 executes a number of pairs of STA and LDA instructions for loading the 6 time of day bytes into the transfer buffer locations of RAM226. More particularly, the least significant byte contained in the A accumulator is stored in location 86 in response to the STA instruction fetched from locations E0F and E10.

When MPU224 executes the LDA instruction, the decoder circuits 230-2 through 230-6, in the manner previously discussed, force signal WDENBL00 to a binary ZERO in response to address 40. This enables the driver/inverter circuits 247 for transfer of the next (5th) byte of the time of day contents stored in latch register 246 into the A accumulator. Also, the negative going edge of signal WDENBL00 shifts the contents of latch register 246 by one bit position enabling the read out of the fourth time of day byte in response to the STA instruction fetched from locations E15 and E16.

When MPU224 completes execution of the STA instruction fetched from locations E23 and E24, which stores the most significant byte in buffer location 81, it executes a RTS instruction. This returns MPU224 to its original address plus 2. The return address is specified by the return address bytes having the values ODFE stored in the last two stack locations. Accordingly, MPU224 fetches the LDAI instruction from locations DFE and DFF. This causes the value 06 to be loaded into the A accumulator. The MPU224, upon executing the JMPE instruction, branches to output to MDC ROM routine $OPMDC00 starting at location 0938 which is used to transfer the time of day bytes to CPU14 via MDC10.

However, when the result of the compare tested by the BEQ instruction is not equal, MPU224 executes the BSR instruction stored at locations EOD and EOF (see lines 194400-194500). This instruction causes MPU224 to branch the start of latch time routine $RDTIME20. Also, during the execution of the BSR instruction, the return address bytes OEOF are stored in the stack in the manner described.

Now, MPU224, upon executing the sequence of LDAI, STA and CLRE instructions again latches the time of day value into latch register 246. The execution of the LDA instruction fetched from locations E2D and E2E results in the MPU224 loading the least significant byte into the A accumulator. Next, MPU224 executes the RTS instruction which returns MPU224 to its original address plus 2. The return address corresponds to the return address bytes having the value OEOF. Therefore, MPU224 begins executing ROM routine $RDTIME11.

As explained above, the $RDTIME11 ROM routine loads the time of day bytes into the buffer locations 86 through 81 and from there the bytes are transferred to CPU14.

It is seen that after MPU224 reads the time of day value stored in counter 248 a third time no further checking is required. The reason is that the first miscompare already established that the time of day value was being updated at the time it was being read. Since the time of day value only changes once every millisecond, the next time, MPU224 reads the time of day value it will be accurate.

Referring to lines 153300-154200, it is seen that the adapter 20 transfers the time of day byte value under the control of ROM routines $OPMDC10 and $TMRMDC10. In greater detail, as seen from line 153400, MPU224 loads the index register with ZEROS in response to the LDXI instruction. Next, it stores the A accumulator value "06" in the transfer counter MDCXCNTR location 80 (see line 8700).

In response to the LDAX instruction, MPU224 loads the A accumulator with the most significant time of day byte fetched from buffer location 81. Upon executing the STA instruction, MPU224 writes the byte applied to DATA bus lines LBT00-07 into a first location specified by address signals BIAD1410 and BIAD1510 in response to signal WFLEN00. As seen from FIG. 3b, the decoder circuits 230-2 through 230-6 force signal DATFL000 to a binary ZERO which cause NAND gate 230-12 to force signal WFILEN00 to a binary ZERO. Then MPU224 branches to ROM routine $TMRMDC10 in response to the BSR instruction fetched from locations 941 and 942.

As seen from lines 149400-150000, MPU224 executes an LDA instruction for applying of the contents of the peripheral data register B which stores the status of the interface circuit flip-flops of block 210 via the data bus lines LBDT00-07 into the A accumulator. Next, MPU224 executes a bit test instruction which ANDS the peripheral register B contents of the A accumulator with the value hexidecimal 40 for testing the state of adapter enable ADMENQ flip-flop 210-2B. Since this flip-flop should be set to a binary ONE, MPU224 executes an LDAI instruction which loads the B accumulator with the value 02. Next, MPU224 executes an STA instruction which transfers the value 02 via the peripheral data register B to the lines count A-D. This causes decoder circuit 241-2 of FIG. 3c to force the signal DREQCK10 to a binary ZERO. As seen from FIG. 3a, signal DREQCK10 switches data service request DATSRQ flip-flop 210-12 to a binary ONE. The MPU224, in response to the CLRE instruction, clears the peripheral data register B to ZEROS.

MPU224 again reads the contents of the peripheral data register B into the A accumulator and ANDS it with the value hexidecimal 10 for testing the state of the DATSRQ flip-flop 210-12 for determining when MDC10 has taken the most significant time of day byte. The DATSRQ flip-flop 210-12 is reset to a binary ZERO when MDC10 forces the adapter byte taken line ADPDBT to a binary ONE. Therefore, when MPU224 via the BNE instruction detects that the data service flip-flop 210-12 has been reset, it executes an RTS instruction which returns it to location 943 of the output to MDC ROM routine $OPMDC000.

As seen from lines 153900-154200, MPU224 increments the index register by one and fetches the DECE instruction from locations 944-946. Upon executing this instruction, MPU224 decrements by one the count stored in the MDCXCNTR location 80 and tests it to determine whether the byte transfer is complete. Since it is not, MPU224 returns to ROM routine $OPMDC10 which transfers the next time of day byte to MDC10. When all the bytes have been transferred, MPU224 executes the RTS instruction fetched from location 949. This returns MPU224 to the interrupt handler ROM routine $IHQ010 for read out of the RTI instruction. Upon execution of the RTi instruction, MPU224 returns to the wait loop in readiness to process the next task word received from MDC10.

From the foregoing, it is seen how the adapter of the present invention operates to provide accurate time of day values to CPU14 in response to commands from MDC10. Also, the adapter, in accordance with the teachings of the present invention, is implemented with a minimum of apparatus utilizing standard integrated circuit chips. This, in turn, reduces manufacturing costs. For example, the arrangement of the invention utilizes the PIA chip to control the internal registers which comprise time of day counter section 24. Also, the arrangement enables the utilization of a single address for transfer of time of day values which simplifies implementation and control.

It will be appreciated by those skilled in the art that many changes may be made to the preferred embodiment of the present invention. For example, other chips similar in function may be used to construct the adapter of the present invention. That is, the counter circuit may be constructed from other chips wherein the counter is incremented instead of decremented. This in turn eliminates the need for the driver/inverter circuits of blocks 242 and 247.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. An adapter for use in a data processing system including a central processing unit and a controller coupled to a common bus, said adapter being connected to receive commands from said controller generated in response to instructions from said central processing units, said adapter comprising:
    an address bus;
    a data bus;
    microprocessing means being connected to receive said commands from said controller and being coupled to said address and data buses;
    random access memory means coupled to said address and data buses, said random access memory means having a plurality of storage locations, a number of said plurality of storage locations providing a transfer buffer;
    programmable read only memory means coupled to said address and data buses, said read only memory means having a plurality of storage locations for storing a number of instruction control sequences;
    peripheral interface adapter circuit means coupled to said address bus and to said data bus for transferring data to an output source;
    free running counter means for storing a predetermined number of bytes corresponding to a time of day value initially received from said central processing unit, said free running counter means being coupled to said peripheral interface adapter circuit means and to said data bus and said free running counter means including free running clock circuit means for generating clocking signals at a predetermined rate for updating said time of day value;
    output latch register means coupled to said counter means and to said data bus; and,
    decoder circuit means coupled to said peripheral interface adapter circuit means and to said output latch register means;
    said microprocessing means being operative in response to one of said commands from said controller to read out instructions of a predetermined one of said instruction control sequences from said read only memory means for generating a sequence of address and data signals on said address bus and data bus respectively and said peripheral interface adapter circuit means being operative in response to said address signals to apply said data signals to said decoder circuit means, said decoder circuit means in response to said data signals generating a control signal for storing a time of day value read from said counter means in said output latch registers means, and transfer means to enable said output latch register means to transfer predetermined byte of successive time of day values to said microprocessing means for comparing the predetermined byte of said value with the same predetermined byte of the next time of day value read out at a rate which is faster than said predetermined rate for verifying that the latest time of day value was read prior to loading said value into said transfer buffer for transfer to said central processing unit by detecting that said time of day value was not read during said updating.

2. The adapter of claim 1 wherein said transfer means includes:
    selector circuit means coupled to said address bus, to said output latch register means and to said interface adapter circuit means, said selector circuit means being operative in response to said address signals to enable said peripheral interface adapter circuit means to apply said data signals to said decoder means and said microprocessing means being operative to generate other address signals in response to instructions of said predetermined one of said control sequences, said selector circuit means being operative in response to said other address signals to able said output latch register circuit means to transfer each said same predetermined byte of a successive pair of time of day values read into said output latch register means to said microprocessing means for said comparison.

3. The adapter of claim 2 wherein said microprocessing means includes accumulator means coupled to said data bus, said predetermined one of said instruction control sequences includes a predetermined series of instructions specifying a load accumulator operation, a store accumulator operation and a clear register operation for conditioning said accumulator means to apply address and data signals to said address and data buses, said peripheral interface adapter circuit means being conditioned by said selector circuit means to apply said data signals to said decoder circuit means for generating a pulse which latches a time of day value into said output latch register means.

4. The adapter of claim 2 wherein said peripheral interface adapter circuit means couples to first and second bidirectional peripheral data buses and includes a pair of control registers and a pair of peripheral data registers, each of said control registers being coupled to said data bus and a different one of said first and second peripheral buses, each of said control registers storing control information for separately controlling the direction of the data transfer for each line of the corresponding one of said peripheral data buses and said pair of peripheral data registers being coupled to said data bus and to said different ones of said peripheral buses, said first peripheral data bus being coupled to apply input data signals to said decoder circuit means for generating control signals to enable the loading of said counter means from said second peripheral data bus and to enable the latching of said time of day values from each counter means into said output latch register means.

5. The adapter of claim 4 wherein another number of said plurality of storage locations of said random access memory means is arranged for storing a plurality of constant values for controlling the operation of said interface adapter circuit means, said microprocessing means being operative during an initialization sequence to transfer said constant values to said pair of control registers for conditioning said peripheral interface adapter circuit means to control the loading and transfer of time of day values into and from said counter means.

6. The adapter of claim 2 wherein said microprocessing means includes an accumulator and said predetermined one of said instruction control sequences includes a compare instruction, said microprocessing means being operative in response to said compare instruction to compare said predetermined byte of a first time of day value stored in a predetermined one of said storage locations of said transfer buffer and said predetermined byte of a second time of day value in said accumulator and said microprocessing means further including indicator means for signaling whether or not there was a miscompare between said predetermined bytes indicating that said time of day value was read during an update operation and is not the latest time of day value.

7. The adapter of claim 6 wherein said predetermined bytes correspond to the latest significant bytes of said time of day values.

8. The adapter of claim 6 wherein said microprocessing means is operative in response to a signal from said indicator means indicative of a miscompare to read out said instructions of said predetermined one of said instruction control sequences for generating a sequence of said address and data signals for storing a further time of day value in said output latch register means corresponding to the latest time of day value.

9. The adapter of claim 8 wherein said microprocessing means is operative upon reading said further time of day value to read out another one of said instruction control sequences from said read only memory means for generating a series of address and data signals on said address and data buses for read out of said predetermined number of bytes of said further time of day value from said output latch register means into corresponding ones of said storage locations of said transfer buffer for transfer to said central processing unit.

10. The adapter of claim 6 wherein said microprocessing means is operative in response to a signal from said indicator means indicative of a compare to read out another one of said instruction control sequences from said read only memory means for generating a series of address and data signals on said address and data buses for read out of said predetermined bytes of said second time of day value from said output latch register means into corresponding ones of said transfer buffer for transfer to said central processing unit.

11. The adapter of claim 9 or 10 wherein said output latch register means includes a plurality of series coupled shift register circuits corresponding in number to said predetermined number, each of said shift register circuits having a plurality of stages, the same predetermined stage of each said shift register circuit being coupled to a different conductor of said data bus and said selector circuit means being operative in response to each of said other address signals having the same coding to generate a write enable pulse signal for transferring byte signals from said same predetermined stages of said shift register circuits to said data bus and shifting by one stage the time of day value contents of said output latch register means for transfer of the next byte to said data bus.

12. The adapter of claim 11 wherein said predetermined stage of each of said shift register circuits corresponds to the least significant bit position and wherein said predetermined number corresponds to the number of byte bits.

13. A data processing system including a central processing unit and a controller coupled to a common bus, said controller having a number of ports for connecting a corresponding number of adapter units and including means for generating read commands to said adapter units, one of said adapter units comprising:
  a microprocessing section coupled to receive commands from said controller, said section including:
    a data bus;
    an address bus;
    microprocessing means coupled to said data and address buses;
    random access memory means having a plurality of storage locations, a number of said plurality of storage locations providing a multibyte transfer buffer, said random access memory means being coupled to said data bus and to said address bus;
    read only memory means having a plurality of storage locations for storing a number of instruction control sequences, said read only memory means being coupled to said address and data buses;
    peripheral interface adapter circuit means for transferring data, said peripheral interface adapter circuit means being coupled to said address bus and to said data bus and to a bidirectional peripheral data bus;
  a time of day counter section being coupled to said microprocessing section, said time of day counter section including:
    counter means for storing a predetermined number of bytes corresponding to a time of day value, said free running counter means being coupled to said peripheral interface circuit means and to said data bus;
    free running clock circuit means coupled to said counter means for generating clock signals for updating said time of day value at a predetermined rate;
    output latch register circuit means coupled to said counter means and to said data bus; and, decoder circuit means coupled to said bidirectional peripheral data bus and to said output register circuit means; and, selector circuit means coupled to said address bus, to said output latch register means and to said peripheral interface adapter circuit means, said microprocessing means being operative in response to a read command from said controller to read out instructions of a predetermined one of said instruction control sequences from said read only memory means for generating address and data signals on said address bus and data bus respectively, said selector circuit means being operative in response to said address signals to enable said peripheral interface adapter circuit means to apply said data signals on said peripheral bus to said decoder circuit means, said decoder circuit means in response to said data signals generating a series of output pulse signals for storing successive time of day values read from said counter means in said output latch register means, and said selector circuit means being operative in response to other address signals generated by said microprocessing means to enable said output latch register circuit means to transfer a predetermined byte of each successive time of day value to said microprocessing means for comparison to select the latest time of day value read from said counter means not during an update operation for loading into said transfer buffer of said random access memory means for transfer to said central processing unit in response to one of said read command applied to said one of said adapter units.

14. The system of claim 13 wherein said microprocessing means includes accumulator means coupled to said data bus, said predetermined one of said instruction control sequences includes a predetermined series of instructions specifying a load accumulator operation, a store accumulator operation and a clear register operation for conditioning said accumulator means to apply address and data signals to said address and data buses, said peripheral interface adapter circuit means being conditioned by said selector circuit means to apply said data signals to said decoder circuit means for generating a pulse which latches a time of day value into said output latch register means.

15. The system of claim 13 wherein said peripheral interface adapter circuit means couples to another bidirectional peripheral data bus and includes a pair of control registers and a pair of peripheral data registers, each of said control registers being coupled to said data bus and to a different one of said peripheral buses, each of said control registers storing control information for separately controlling the direction of the data transfer for each line of the corresponding one of said peripheral data buses and said pair of peripheral data registers being coupled to said data bus and to said different ones of said peripheral buses, said peripheral data bus being coupled to apply input data signals to said decoder circuit means for generating control signals to enable the loading of said counter means from said another peripheral data bus and to enable the latching of said time of day values from said counter means into said output latch register means.

16. The system of claim 15 wherein another number of said plurality of storage locations of said random access memory means is arranged for storing a plurality of constant values for controlling the operation of said peripheral interface adapter circuit means, said microprocessing means being operative during an initialization sequence to transfer said constant values to said pair of control registers for conditioning said peripheral interface adapter circuit means to control the loading and transfer of time of day values into and from said counter means.

17. The system of claim 13 wherein said microprocessing means includes an accumulator and said predetermined one of said instruction control sequences includes a compare instruction, said microprocessing means being operative in response to said compare instruction to compare said predetermined byte of a first time of day value stored in a predetermined one of said storage locations of said transfer buffer and said predetermined byte of a second time of day value in said accumulator and said microprocessing means further including indicator means for signaling whether or not there was a miscompare between said predetermined bytes indicating that said time of day value was read during an update operation and does not correspond to the latest time of day value.

18. The system of claim 17 wherein said predetermined bytes correspond to the least significant bytes of said time of day values.

19. The system of claim 17 wherein said microprocessing means is operative in response to a signal from said indicator means indicative of a miscompare to read out said instructions of said predetermined one of said instruction control sequences for generating a sequence of said address and data signals for storing a further time of day value in said output latch register means corresponding to the latest time of day value.

20. The system of claim 19 wherein said microprocessing means is operative upon reading said further time of day value to read out another one of said instruction control sequences from said read only memory means for generating a series of address and data signals on said address and data buses for read out of said predetermined number of bytes of said further time of day value from said output latch register means into corresponding ones of said storage locations of said transfer buffer for transfer to said central processing unit.

21. The system of claim 17 wherein said microprocessing means is operative in response to a signal from said indicator means indicative of a compare to read out another one of said instruction control sequences from said read only memory means for generating a series of address and data signals on said address and data buses for read out of said predetermined bytes of said second time of day value from said output latch register means into corresponding ones of said transfer buffer for transfer to said central processing unit.

22. The system of claim 20 or 21 wherein said output latch register means includes a plurality of series coupled shift register circuits corresponding in number to said predetermined number, each of said shift register circuits having a plurality of stages, the same predetermined stage of each said shift register circuit being coupled to a different conductor of said data bus and said selector circuit means being operative in response to each of said other address signals having the same coding to generate a write enable pulse signal for transferring byte signals from said same predetermined stages of said shift register circuits to said data bus and shifting by one stage the time of day value contents of said latch register means for transfer of the next byte to said data bus.

23. A data processing system including a central processing unit and a controller coupled in common to a bus, said controller having a number of ports for connecting a corresponding number of adapter units and including means for generating commands to said adapter units, one of said adapter units comprising:
- a microprocessing section coupled to said controller for transferring and receiving signals from said controller, said section including:
  - a data bus;
  - an address bus;
  - a microprocessing unit coupled to said data bus and to said address bus;
  - random access memory having a plurality of storage locations, a number of said plurality of storage locations providing a transfer buffer, said random access memory being coupled to said data and address buses;
  - a programmable read only memory coupled to said address and data buses having a plurality of storage locations for storing a number of instruction control sequences;
  - a clock circuit coupled to said controller for receiving timing signals from said controller and being coupled to said microprocessing section, said clock circuit for generating timing signals for synchronizing at a microsecond rate the operations of said microprocessing section within said adapter;
  - a peripheral interface adapter circuit coupled to said data bus and to first and second bidirectional peripheral data buses, said peripheral interface adapter circuit including a pair of control registers, each coupled to said data bus and a different one of said first and second peripheral buses, each of said registers storing control information for separately controlling the direction of data for each line of the corresponding one of said peripheral data buses;
  - a time of day counter section coupled to said microprocessing section, said time of day counter section including:
    - a binary counter coupled to said first peripheral bus, said counter for storing a time of day value;
    - a free running clock circuit coupled to said binary counter for generating clock signals for updating said time of day value at a millisecond rate;
    - an output latching register coupled to said counter and to said data bus; and,
    - a decoder circuit coupled to said second peripheral bus and to said output latch register; and,
    - a selector circuit coupled to said address bus, to said output latch register and to an enable input terminal of said peripheral interface adapter circuit;
  - said microprocessing unit being operative in response to a command from said controller requesting the time of day to read out a predetermined one of said instruction sequences from said read only memory for generating a succession of address and data signals on said address bus and data bus respectively, said selector circuit being operative in response to said address signals to apply a signal on said enable input terminal of said peripheral interface adapter circuit for applying said data signals on said second peripheral bus to said decoder circuit, said decoder circuit in response to said data signals generating a series of output pulses for storing a predetermined number of time of day values read from said counter in said output latching register and said selector circuit being operative in response to other address signals generated by said microprocessing unit to generate a series of output pulse signals to condition said output latch register to transfer a predetermined byte of each predetermined number of said time of day values to said microprocessing unit for comparison to select the latest time of day value read from said binary counter not during an update operation for storage in said transfer buffer of said memory for subsequent transfer to said central processing unit in response to said read command.

24. The data processing system of claim 23 wherein said predetermined number of said time of day values is two.

25. The data processing system of claim 24 wherein said microprocessing unit includes an accumulator coupled to said data bus, said predetermined one of said instruction control sequences includes a predetermined series of instructions specifying a load accumulator operation, a store accumulator operation and a clear register operation for conditioning said accumulator to apply address and data signals to said address and data buses, said peripheral interface adapter circuit being conditioned by said selector circuit to apply said data signals to said decoder circuit for generating a different one of said output pulses which latches each of said predetermined number of time of day values into said latching register.

26. The data processing system of claim 24 wherein said microprocessing unit includes an accumulator coupled to said data bus and said predetermined one of said instruction control sequences includes a compare instruction, said microprocessing unit being operative in response to said compare instruction to compare said predetermined byte of a first time of day value stored in one of said storage locations of said transfer buffer and said predetermined byte of a second time of day value in said accumulator and said microprocessing unit further including an indicator circuit for signaling a compare between said predetermined bytes indicating that one of said time of day values was read while said counter was being updated.

27. The data processing system of claim 26 wherein said predetermined bytes correspond to the least significant bytes of said time of day values.

28. The data processing system of claim 26 wherein said microprocessing unit is operative in response to a signal from said indicator means indicative of a miscompare to read out said instructions of said predetermined one of said instruction control sequences for generating a sequence of said address and data signals for storing a further time of day value in said output latching register.

29. The data processing system of claim 28 wherein said microprocessing unit is operative upon reading said further time of day value to read out another one of said instruction control sequences from said programmable read only memory for generating a series of address and data signals on said address and data buses for read out of said predetermined number of bytes of said further time of day value from said output latching register into corresponding ones of said storage locations of said transfer buffer for transfer to said central processing unit.

30. The data processing system of claim 26 wherein said microprocessing unit is operative in response to a signal from said indicator circuit indicative of said compare to read out another one of said instruction control sequences from said programmable read only memory for generating a series of address and data signals on said address and data buses for read out of said predetermined bytes of said second time of day value from said output latching register into corresponding ones of said transfer buffer for transfer to said central processing unit.

31. The data processing system of claim 29 or 30 wherein said latching register includes a plurality of series coupled shift register circuits corresponding in number to said predetermined number, each of said shift register circuits having a plurality of stages, the same predetermined stage of each said shift register circuit being coupled to a different conductor of said data bus and to said selector circuit being operative in response to each of said other address signals having the same coding to generate a write enable pulse signal for transferring byte signals from said same predetermined stages of said shift register circuits to said data bus and shifting by one stage the time of day value contents of said output latching register for transfer of the next byte to said data bus.

* * * * *